United States Patent [19]
Saiki et al.

[11] Patent Number: 5,677,802
[45] Date of Patent: Oct. 14, 1997

[54] PHASE LOCKED LOOP CIRCUIT WITH ADJUSTABLE OFFSET CHARACTERISTIC, METHOD FOR ADJUSTMENT AND APPARATUS

[75] Inventors: Eisaku Saiki, Yokohama; Masashi Mori, Chigasaki; Shintaro Suzumura; Shoichi Miyazawa, both of Yokohama; Terumi Takashi, Odawara, all of Japan

[73] Assignee: Hitachi, Ltd., Tokyo, Japan

[21] Appl. No.: 405,895

[22] Filed: Mar. 17, 1995

[30] Foreign Application Priority Data

Mar. 18, 1994 [JP] Japan .................................. 6-048903

[51] Int. Cl.$^6$ .................................. G11B 5/09; G11B 27/36
[52] U.S. Cl. .................................. 360/51; 360/31; 367/48; 367/54; 367/89
[58] Field of Search .................................. 360/46, 51, 31, 360/77.08; 331/1 A; 327/156; 369/48, 54, 59

[56] References Cited

U.S. PATENT DOCUMENTS 5,341,249  8/1994  Abbott et al. ..................... 360/51 X
5,404,250  4/1995  Hase et al. ........................ 360/51
5,436,770  7/1995  Muto et al. ........................ 360/51

Primary Examiner—Aristotelis M. Psitos
Assistant Examiner—Patrick Wamsley
Attorney, Agent, or Firm—Antonelli, Terry, Stout & Kraus, LLP.

[57] ABSTRACT

A phase locked loop circuit having a voltage controlled oscillator for generating a clock signal with a frequency determined by a voltage control signal supplied to the voltage controlled oscillator, an AD-conversion circuit for sampling a target signal with a timing determined by the clock signal and for converting sampled values into digital data, a phase locked loop control circuit for generating control data with values representing values of the digital data, and a DA-conversion circuit having an adjustable conversion characteristic for converting the control data into an analog signal and for outputting the analog signal to the voltage controlled oscillator as the voltage control signal. The adjustable conversion characteristic of the DA-conversion circuit is adjusted on the basis of an input signal having predetermined playback characteristics and when the phase locked loop circuit is part of a recording and reproducing apparatus, the input signal is a reproduced signal from a signal recorded on a recording medium.

20 Claims, 16 Drawing Sheets

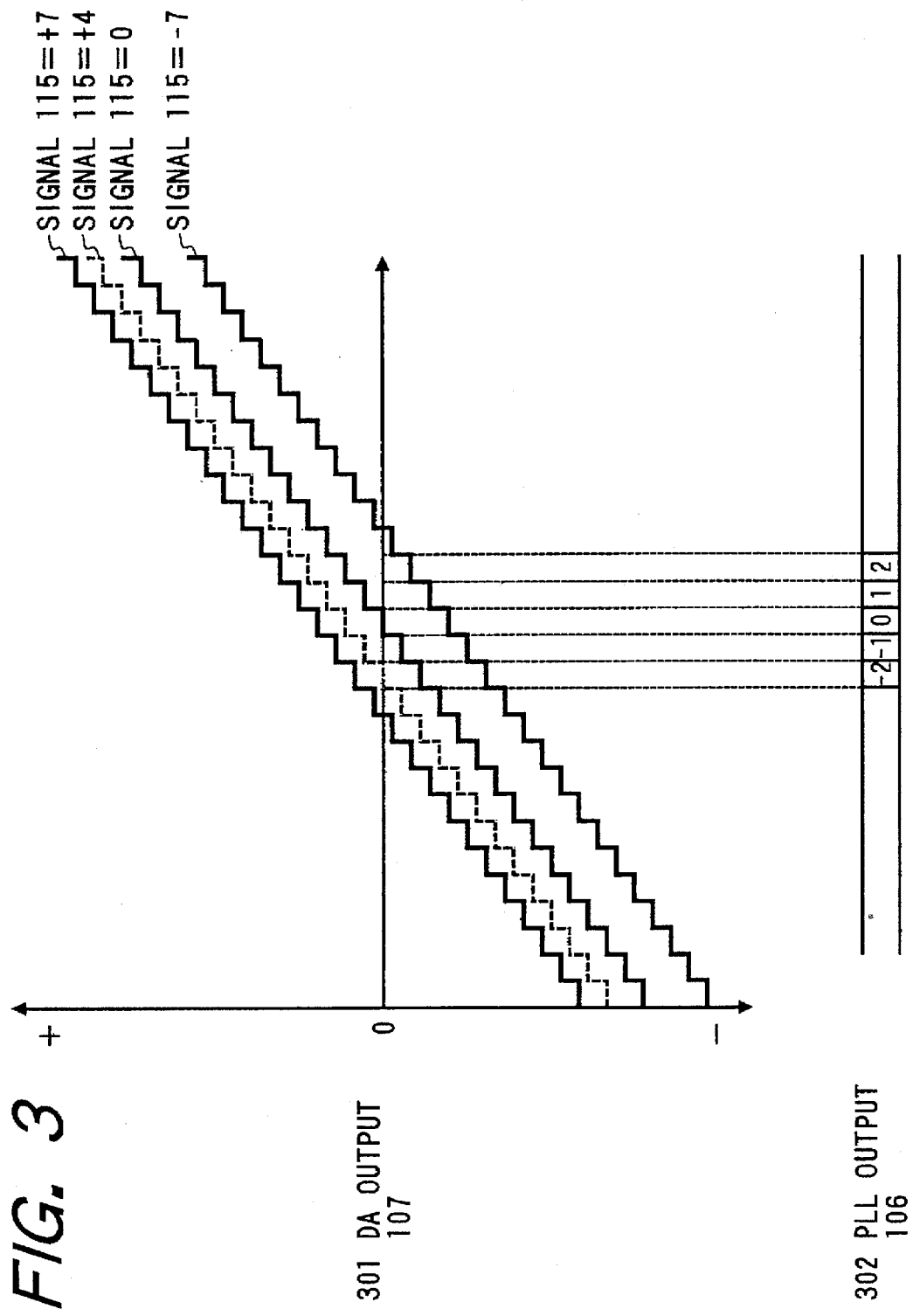

PHASE LOCKED LOOP CIRCUIT WITH ADJUSTABLE OFFSET CHARACTERISTIC, METHOD FOR ADJUSTMENT AND APPARATUS

CROSS-REFERENCE TO RELATED APPLICATIONS

This application is related to application Ser. No. 354,266 filed Dec. 12, 1994 which is a continuation of application Ser No. 216,606 filed Mar. 23, 1994 which is a continuation application of Ser. No. 964,294 filed Oct. 21, 1992 which is a continuation of application Ser. No. 734,073 filed Jul. 22, 1991 which is a continuation of application Ser. No. 329,552 filed Mar. 28, 1989 and is related to application Ser. No. 360,426 filed Dec. 21, 1994 which is a continuation of application Ser. No. 177,694 filed Jan. 4, 1994 which is a continuation of application Ser. No. 603,294 filed Oct. 25, 1990, the subject matter of the related applications being incorporated by reference herein.

BACKGROUND OF THE INVENTION

The present invention relates to a phase locked loop circuit used in generation of a clock signal in a recording and reproducing apparatus. In particular, the present invention relates to technology for increasing the precision of the generated clock signal.

In the case of a conventional recording and reproducing apparatus, a phase locked loop (PLL) technique is widely adopted in a phase locked loop circuit for generating clock pulses synchronized with fundamental periods of a reproducing or playback signal from a magnetic recording medium which is converted into a pulse signal.

The reproducing system of a recording and reproducing apparatus adopting such a PLL technique is shown in FIG. 17 and comprises a disc-typed magnetic recording medium 1, a magnetic head 16 for converting a magnetic signal stored on the magnetic recording medium 1 into an electrical signal 117, a R/W (Read/Write) amplifier 2 for amplifying the electrical signal output by the magnetic head 16, an AGC (Automatic Gain Controller) circuit 3 for controlling a signal 101 output by the R/W amplifier 2 to give an all-time fixed amplitude, a filter circuit 4 for equalizing the waveform of a signal 102 output by the AGC circuit 3, a waveform shaping circuit 20 for converting a signal 103 output by the filter circuit 4 into a pulse-form binary signal 125, a phase locked loop circuit 25 with a PLL configuration for receiving a signal 125 output by the waveform shaping circuit 20 and for generating clock pulses 124 synchronized with the fundamental periods of a reproducing or playback signal 110, a detection-window generating circuit 27 for generating detection windows from the clock pulses 124, a delay circuit 29 for providing a delay to the signal 125 output by the waveform shaping circuit 20, a discriminator circuit 26 for determining whether or not a pulse of a signal 126 output by the delay circuit 29 exists in a detection window and outputting the playback signal 110 synchronized with the clock pulses 124 and a demodulation circuit 30 for receiving the playback signal 110 output by the discriminator circuit 26 and demodulating modulated data recorded on the magnetic head 16. The phase locked loop circuit 25 include a comparing circuit 21 for comparing the phase of the signal 125 output by the waveform shaping circuit 20 to the phase of the clock pulses 124 output by a VCO (Voltage Controlled Oscillator) circuit 24 and for varying the duty cycle of a pulse signal 121 output thereby in accordance with a difference in phase between the signal 125 and the clock pulses 124, a charge pump circuit 22 for converting the pulses 121 output by the phase comparing circuit 21 into a current 122, an integration circuit 23 for converting the current 122 into a voltage waveform 123 through integration of the current 122 and the VCO circuit 124 for generating the clock pulses 124 with a frequency depending upon the voltage of the waveform 123 output by the integration circuit 23.

The principle of operation of such a reproducing system is described by referring to timing charts shown in FIG. 18 wherein a timing chart 1601 shows the output signal 125 of the waveform shaping circuit 20, which is a binary-format signal resulting from conversion of a signal 103 read into the circuit 20. As shown in timing chart 1602, the VCO circuit 24 generates a signal synchronized with the pulse 125 output by the waveform shaping circuit which is indicated by a solid line in the timing chart 1601. The detection-window generating circuit 27 outputs a signal 128 by dividing the frequency of the signal 124 as shown in timing chart 1603. The period of the "H" level of the signal 128 output by the detection-window generating circuit 27 is a detection window. On the other hand, the delay circuit 29 delays the signal 125 output by the waveform shaping circuit 20 as shown in timing chart 1604. The discrimination circuit 26 detects an "H" level of a signal 126 output by the delay circuit 29 generated during the period of the "H" level of the signal 128 (or the detection window), outputting a signal to the demodulation circuit 30.

In a recording and reproducing apparatus employing a magnetic disc, a peak-shift phenomenon of a read-in signal generally occurs due to, among other causes, noise and magnetic interference generated in the magnetic head and the R/W amplifier. As a result, jitters having an amplitude D, for example, appear in the signal 125 output by the waveform shaping circuit 20 as shown by a dashed line in the timing chart 1601 of FIG. 18. When the jitters cannot be followed by the PLL technique adopted by the phase locked loop circuit 25, a dashed-line pulse shown in the timing chart 1604 is generated, lagging behind the detection window shown in the timing chart 1603. As the amount of time by which the pulse 126 shown in the timing chart 1604 lags behind the detection window shown in the timing chart 1603 increases, causing the pulse 126 to be shifted out of the detection window, the playback or reproducing operation cannot be carried out normally.

If the amount of delay provided by the delay circuit 29 is set at a value equal to a clock pulse so that the pulse 126 shown in the timing chart 1604 has a rising edge coinciding with the center of the detection window shown in the timing chart 1603, the margin against the jitters is maximized. This margin is called a window margin which greatly affects the performance of the recording and playback apparatus. In actuality, however, the pulse 125 of the timing chart 1601 output by the waveform shaping circuit 20 and the clock pulses 124 shown in the timing chart 1602 cannot be synchronized with each other perfectly, resulting in a phase shift occasionally due to time delays caused by propagation of signals through digital circuit elements and offsets of the VCO circuit and the charge pump circuit. In the conventional reproducing system, the amount of delay provided by the delay circuit 29 is therefore adjusted finely in advance in order to correct the phase shift referred to above so that the window margin can be maximized.

In recent years, a recording and reproducing apparatus, wherein a decoding circuit, a phase locked loop circuit and an AGC circuit each comprise a digital-signal processing circuit, has been implemented in addition to the recording and reproducing apparatus described above. For example, a recording and reproducing apparatus, which has a decoding circuit comprising a digital-signal processing circuit for implementing Viterbi decoding, is known. Viterbi decoding is one of techniques for digitally implementing the concept of ML (Maximum Likelihood). It is a decoding method which takes a combination of sequential reproducing or playback-signal values into consideration. When the concept of digital maximum likelihood is applied to the signal-processing system of a recording and reproducing apparatus, a so-called PR (Partial Response) coding technique may be adopted. This coding technique has a power spectrum which is adapted to transmission characteristics of the magnetic recording medium. A technology for increasing the recording density of a recording and reproducing apparatus by adopting both the partial-response and maximum-likelihood methods is known as a PRML (Partial Response Maximum Likelihood) technology.

In a recording and reproducing apparatus adopting such a PR technique, it is desirable to implement its phase locked loop circuit as a digital processing circuit for carrying out phase synchronization by means of a digital signal. A technology disclosed in Japanese Patent Application Laid-open No. H1-143447 is known as a phase locked loop technology utilizing such a PR technique. A phase locked loop pattern used in a phase locked loop system adopting the PR technique is shown in FIG. 21 wherein reference numeral 1901 is a recording current waveform supplied to a magnetic head 16 for recording a phase locked loop pattern in an operation to format a magnetic recording medium. Reference numeral 1902 is a signal denoted by reference numeral 117 in FIG. 17. The signal 1902 is the phase locked loop pattern read out by the magnetic head 16. Having 1-D characteristics, the magnetic recording medium 1 and the magnetic head 16 play back the signal 1902 having values $\{0, 1, 0, -1, 0, 1, 0, -1, 0, 1, 0, -1 \ldots\}$ which represent the phase locked loop pattern 1901. Much like the recording and reproducing apparatus described earlier, such a playback signal is output to a phase locked loop circuit through an AGC circuit and a filter circuit.

The configuration of a phase locked loop circuit for generating a clock signal from the playback signal 1902 is shown in FIG. 19 wherein reference numeral 103 is a signal output by the filter circuit 4. The signal 103 is supplied to the phase locked loop circuit 11 without being converted into a binary format. As shown in the figure, the phase locked loop circuit 11 comprises an AD (analog to digital) circuit 5 for converting the signal 103 output by the filter circuit 4 into a digital signal 104, an EQ (equalization) circuit 6 for carrying out a Nyquist-equalization process on the signal 104 output by the AD circuit 5, a PLL controller circuit 7 for detecting the amount of a phase shift from a signal 105 output by the EQ circuit 6 and outputting an error signal to represent the amount of the phase shift, a DA (digital to analog) circuit 8 for converting a signal 106 output by the PLL controller 7 into a current 107, an integration circuit 9 for outputting a voltage value resulting from integration of the current 107 output by the DA circuit 8 and a VCO circuit 10 for outputting clock pulses with a frequency determined by a voltage 108 output by the integration circuit 9. The signal 103 output by the filter circuit 4 is converted into the digital signal 104 by the AD circuit 5 with timing determined by the clock pulses 109 output by the VCO circuit 10. It should be noted that the clock pulses 109 are denoted by reference numeral 1903 in FIG. 21. The PLL controller circuit 7 further comprises a [1+D] circuit 36 for performing band limitation on the signal 105 output by the EQ circuit 6, delay circuits 32 and 33 each for delaying data 136 output by the [1+D] circuit 36 by a clock period of the clock pulses 109, a comparison circuit 31 for determining whether the data 136 output by the [1+D] circuit 36 is either positive, zero or negative and outputting "1", "0" or "−1" for a positive, zero or negative result of the detection of the data 136, multiplier circuits 34 and 35 for multiplying digital data by each other and a subtraction circuit 37 for subtracting digital data from other digital data.

The principle of operation of this phase locked loop circuit is described by referring to timing charts shown in FIG. 20 wherein reference numeral 1801 denotes the clock pulses 109 output by the VCO circuit 10 whereas reference numeral 1802 is the signal 105 completing the Nyquist-equalization process in the EQ circuit 6 which receives a digital signal 104 as an output of the AD circuit 5 for digitizing the signal 103 which is output by the filter circuit 4 in accordance with timing determined by the clock pulses 109. The signal 105 is output by the phase locked loop circuit 11 to a circuit at a later stage for carrying out decoding and demodulation processes on the signal 105. At a point of time (a) shown in FIG. 20, a difference in phase between the clock pulse 109 denoted by reference numeral 1801 and the signal 105 denoted by reference numeral 1802 is generated, resulting in a time shift "d" from a dashed-line waveform indicating a synchronized state of the clock pulse 109 with the signal 105. As a result, the sampled value is not an ideal value of "0". Instead, an error is generated in the sampled value. At a point of time (i), the difference in phase is suppressed, resulting in a sampled value equal to the ideal value "0".

Reference numeral 1803 in FIG. 20 is the signal 136 output of the [1+D] circuit 36 which has undergone [1+D] processing therein. In the [1+D] processing, a current sampled value is added to a previous sampled value. Reference numeral 1804 is a signal obtained by delaying the signal 136 by means of the delay circuit 32 by one period of the clock pulses 109. Reference numeral 1805 is the signal 135 output by the comparison circuit 31 to indicate whether the sampled value is positive, zero or negative. Reference numeral 1806 is the signal 133 output by the delay circuit 33, a signal obtained by delaying the signal 135 by means of the delay circuit 31 by one period of the clock pulses 109. Reference numeral 1807 is the signal 134 output by the multiplier circuit 35, a result obtained by multiplying the signal 133 by the signal 136. Reference numeral 1808 is the signal 132 output by the multiplier circuit 34, a result obtained by multiplying the signal 131 by the signal 135. Reference numeral 1809 is the signal 106 output by the subtractor circuit 37, a result obtained by subtracting the signal 132 from the signal 134. Reference numeral 1810 is an analog signal output by the DA circuit 8, a result of converting the signal 106 into a continuous current. This analog signal is an error signal indicating a phase shift. The signal 106 is integrated by an integration circuit 9, being converted into a voltage value which is then output as the clock pulses 109 by the VCO circuit 10. The clock pulses 109 are fed back to the AD circuit 5.

In this feedback system, the VCO circuit 10 is actually controlled by the voltage signal output by the integration circuit 9. More specifically, a negative voltage signal reduces the frequency of the clock pulses 109. On the contrary, a positive voltage signal increases the frequency of the clock pulses 109. As a result, when a difference in level e1 between the signal 136 output by the [1+D] circuit 36 at a point of time (b) and a point of time (c) exists, the PLL mechanism works to make the difference in level e1 zero. With the phase locked loop circuit adopting the PR technique, the timing of the clock pulses 109 is controlled in such a way that the signal 105 output by the EQ circuit 6 is converged to a value of zero at the points of time (a), (c), (e), (g) and (i). As a result, the signal 105 output by the EQ circuit 6 satisfies Nyquist's condition, allowing the decoding circuit at the later stage referred to above to carry out decoding and demodulation processes accurately.

In the phase locked loop circuit of a recording and reproducing or playback apparatus adopting such a PR technique, an offset in the AD circuit or the DA circuit results in a phase shift in the VCO clock, giving rise to disorder in the sampling timing of the AD circuit. As a result, the margin against jitters of the playback signal caused by noise or a peak-shift phenomenon is reduced, making a decoding error prone to occur in the reproducing operation.

SUMMARY OF THE INVENTION

It is an object of the present invention to provide a phase locked loop circuit, which can correct an offset of the phase locked loop circuit with ease, for generating clock pulses with a phase synchronized to an input signal by utilization of digital-signal processing as well as to provide a recording and reproducing apparatus employing such a phase locked loop circuit.

In order to achieve the above-noted object, the present invention provides a recording and reproducing apparatus including a recording medium, a modulation unit for modulating data to be recorded to generate-data ready for recording, a write/read unit for writing a recording signal conveying the data ready for recording into the recording medium and for reading out the recording signal written into the recording medium, a phase locked loop circuit for generating a clock signal with a phase synchronized to the recording signal read out from the recording medium, a demodulation unit for demodulating data conveyed by the recording signal read out by the write/read unit by using the clock signal to generate reproducing or playback data. The phase locked loop circuit comprises a voltage controlled oscillator for generating the clock signal with a frequency determined by a voltage control signal applied to said voltage controlled oscillator, an AD-conversion circuit for sampling the recording signal read out by said write/read unit with sampling timing determined by the clock signal and converting sampled values into digital-data pieces, a phase locked loop control circuit for generating control data with values representing values of the digital-data pieces output by the AD-conversion circuit, and a DA-conversion circuit with an adjustable conversion characteristic for converting the control data into an analog signal and supplying the analog signal to the voltage controlled oscillator as the voltage control signal.

According to the present invention, the recording and reproducing apparatus includes a control unit for adjusting the conversion characteristic of the DA-conversion circuit by executing steps of driving the write/read unit to read out from the recording medium a test recording signal conveying predetermined test pattern data stored in advance in the recording medium, driving the demodulation unit to reproduce test playback data from the predetermined test pattern data conveyed by the test recording signal read out by the write/read unit, comparing the test playback data to the predetermined test pattern data, making a judgment as to whether or not contents of the test playback data are erroneous, and carrying out adjustment of the conversion characteristic of the DA conversion circuit based on a result of the judgment as to whether or not the contents of the test playback data are erroneous and the conversion characteristic of the DA-conversion circuit prevailing in the event of an operation carried out by the write/read unit to read out from the recording medium the test recording signal conveying the predetermined test pattern data stored in advance in the recording medium.

As a criterion used for adjusting the conversion characteristic of the DA conversion circuit, a result of judgment which is obtained by comparing recording data resulting from modulation of the predetermined test pattern data by the modulation unit to recording data conveyed by a test recording signal read out by the write/read unit from the recording medium and judging whether or not playback contents of the recording data conveyed by the test recording signal are erroneous. Alternatively, a result of judgment obtained by judging values extracted from digital data resulting from conversion carried out by the AD- conversion circuit employed in the phase locked loop circuit with predetermined timing can be used.

In the recording and reproducing apparatus provided by the present invention, typically, the conversion characteristic of the DA conversion circuit is adjusted by executing steps of driving the write/read unit to read out from the recording medium a test recording signal conveying predetermined test pattern data stored in advance in the recording medium, driving the demodulation unit to reproduce test playback data from the test recording signal, comparing the test playback data to the predetermined test pattern data, determining whether or not contents of the test playback data are erroneous, and carrying out adjustment of the conversion characteristic of the DA conversion circuit based on a result of the determination as to whether or not the contents of the test playback data are erroneous and the conversion characteristic of the DA-conversion circuit prevailing in the event of an operation carried out by the write/read unit to read out the test recording signal from the recording medium representing the predetermined test pattern data stored in advance in the recording medium. Accordingly, a desirable conversion characteristic of the DA-conversion circuit which, for example, results in playback contents of data with a minimum number of errors, hence, preserving a sufficient margin against jitters of the data, can be found from the result of the determination. As a result, an offset of the phase locked loop circuit can be compensated for by adjusting the conversion characteristic of the DA-conversion circuit to the desirable conversion characteristic.

Other and further objects and features of the invention will appear more fully from the following description.

BRIEF DESCRIPTION OF THE DRAWINGS

FIG. 3 is a diagram showing input/output characteristics of the DA circuit of FIG. 2;

DESCRIPTION OF THE PREFERRED EMBODIMENTS

Figure 1:
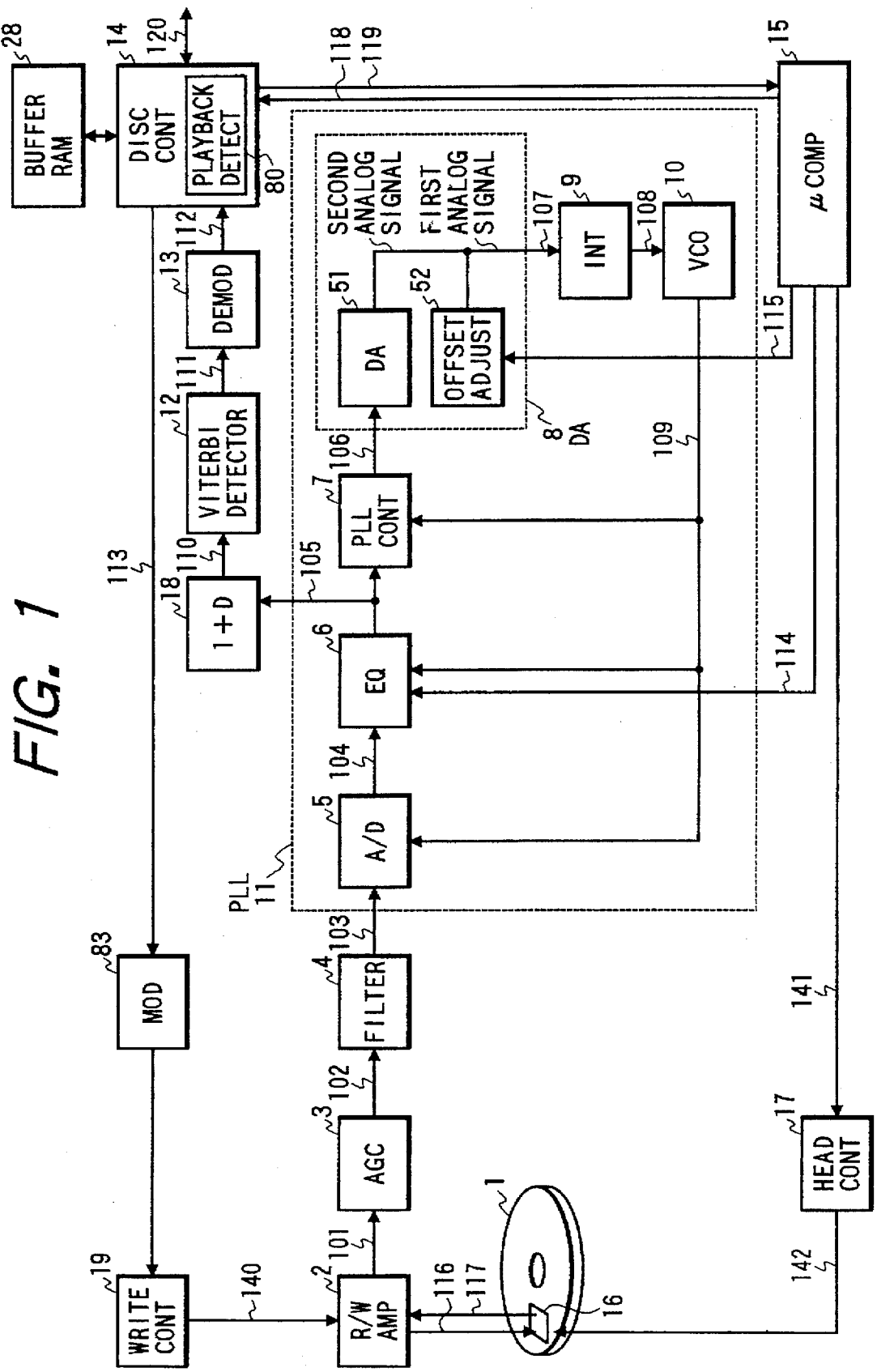
FIG. 1 is a block diagram showing a first embodiment of a recording reproducing apparatus in accordance with the present invention.

Preferred embodiments implementing a phase locked loop circuit in accordance with the present invention are described by reference to a recording and reproducing apparatus wherein like reference numerals are utilized to designate like parts throughout the several views.

FIG. 1 shows a first embodiment of the present invention which implements a recording and reproducing apparatus and includes a magnetic recording medium 1, a magnetic head 16, a R/W (read/write) amplifier 2, an AGC circuit 3, a filter circuit 4 and a phase locked loop circuit 11 for converting a signal 103 output by the filter circuit 4 into a digital playback signal 105 as well as controlling timing with which the signal 103 output by the filter circuit 4 is converted into the digital reproducing or playback signal 105. In addition, the recording and playback apparatus is also equipped with a [1+D] circuit 18 for carrying out quantization-output band limitation conforming to PR4 (Partial Response Clause 4), the name of a type of Partial Response technique, by using a clock signal generated by the phase locked loop circuit 11 on the digital playback signal 105 output by the phase locked loop circuit 11, a Viterbi discrimination circuit 12 for performing a Viterbi decoding process on a signal output by the [1+D] circuit 18 and a demodulation circuit 13 for demodulating data output by the Viterbi discrimination circuit 12. The recording and reproducing or playback apparatus also has a magnetic-disc controller 14 for transferring a signal output by the demodulation circuit 13 to a host computer during a playback operation and transferring data 113 to be recorded from the host computer to a modulation circuit 83 during a recording operation, the modulation circuit 83 for receiving and modulating the data to be recorded 113 from the magnetic-disc controller circuit 14 during a recording operation, a recording or write control circuit 19 for transferring a signal output by the modulation circuit 83 synchronously with a recording clock signal to the R/W amplifier 2, a buffer RAM circuit 28 for storing data to be recorded 113 and playback data, a microcomputer 15 for controlling operations of the magnetic-disc controller circuit 14 as well as adjusting the characteristic of a Nyquist-equalization process carried out by the EQ circuit 6 and the current offset of the DA circuit 8 and a head controller circuit 17 for controlling seek and tracking operations of a magnetic head. The modulation circuit 83 is used for converting data into codes suitable for the recording medium with the modulation and demodulation circuits 83 and 13 carrying out coding and decoding operations respectively which conform to, typically, the 8–9 coding convention.

The phase locked loop circuit 11 includes an AD circuit 5 for converting the signal 103 output by the filter circuit 4 into a digital signal 104, the EQ circuit 6 for performing a Nyquist-equalization process on the digital signal 104 output by the AD circuit 5, a PLL controller circuit 7 for detecting the amount of a phase shift from a signal 105 output by the EQ circuit 6 and outputting the amount of the phase shift as an error signal, a DA circuit 8 for converting the signal 106 output by the PLL controller circuit 7 into a current signal 106, an integration circuit 9 for integrating a current signal 106 output by the PLL controller circuit 7 in a process of conversion into the value of a voltage 108 and a VCO circuit 10 for generating a clock pulse signal having a frequency corresponding to the voltage 108 output by the integration circuit 9. The first embodiment has a configuration such that the microcomputer 15 can adjust the characteristic of the Nyquist-equalization process carried out by the EQ circuit 6 and set a current offset for the current signal 106 output by the DA circuit 8 as described above.

Figure 19:
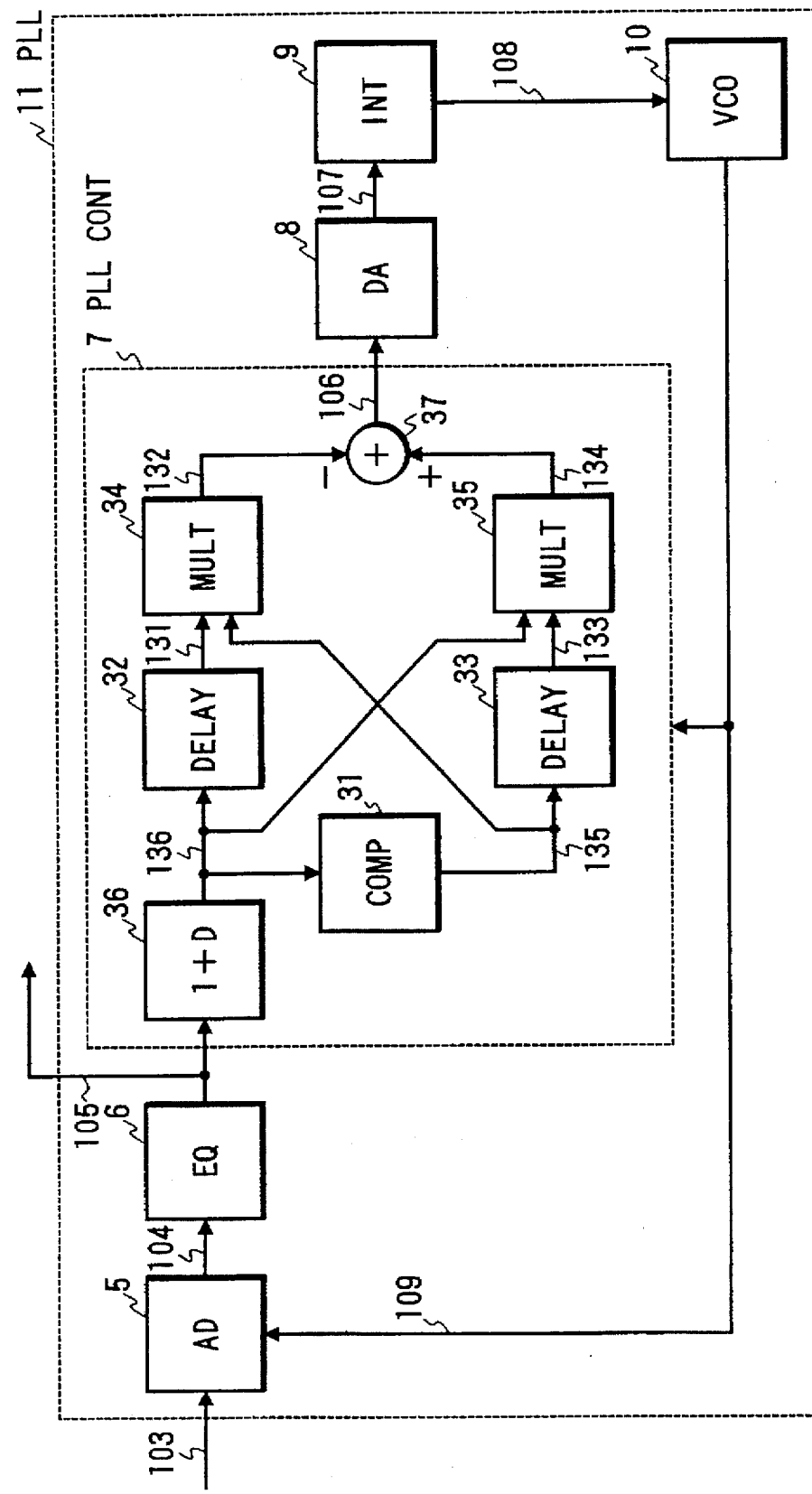
FIG. 19 is a block diagram showing a conventional phase locked loop circuit.
Figure 20:
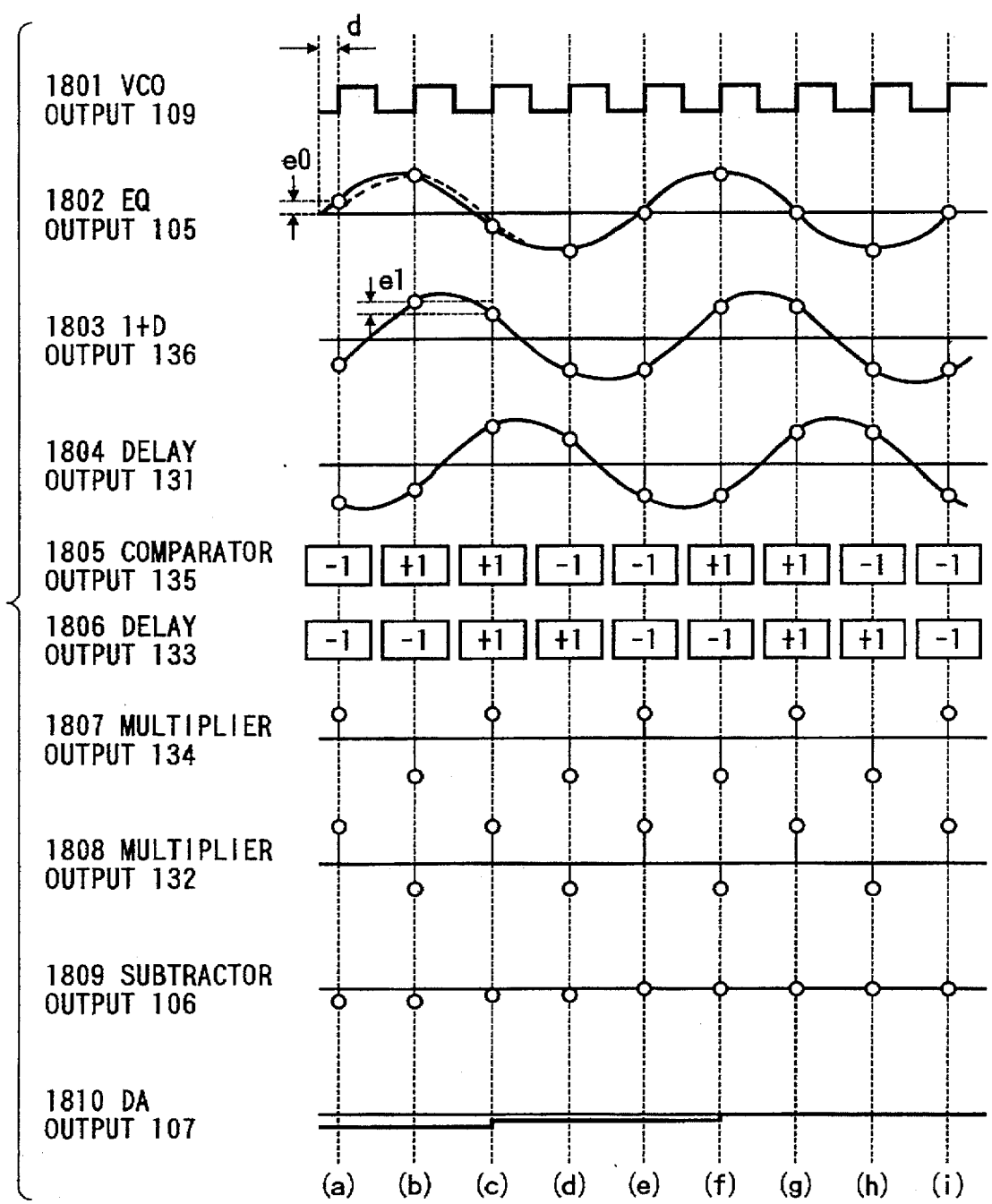
FIG. 20 are timing charts showing operational timing of the conventional phase locked loop circuit.

The PLL controller circuit 7, in a manner similar to the apparatus of FIG. 19, further comprises a [1+D] circuit 36 for performing band limitation on the signal 105 output by the EQ circuit 6, delay circuits 32 and 33 each for delaying data 136 output by the [1+D] circuit 36 by one clock period of the clock pulses 109, a comparison circuit 31 for determining whether the data 136 output by the [1+D] circuit 36 is either positive, zero or negative and outputting "1", "0" or "−1" for a positive, zero or negative result of the detection of the data 136, multiplier circuits 34 and 35 for multiplying digital data by each other and a subtraction circuit 37 for subtracting digital data from other digital data. The other features correspond to those described with reference to FIG. 19.

Figure 2:
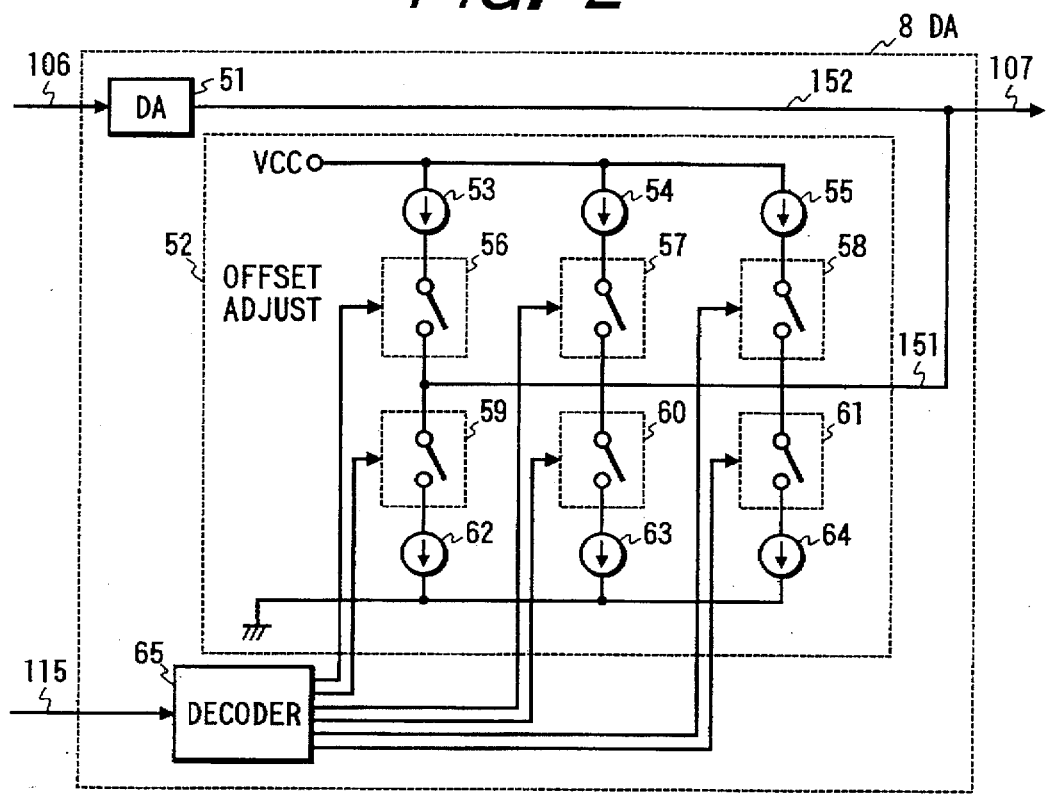
FIG. 2 is a block diagram showing a DA circuit employed in the first embodiment.

The DA circuit 8 is shown in FIG. 2 and includes a DA converter 51 for converting input data 106 into a current analog signal 152 and an offset adjusting unit 52 for providing an offset current 151 to the current analog signal output by the DA converter 51. The offset adjusting unit 52 further includes current source circuits 53, 54, 55, 62, 63 and 64, switch circuits 56, 57, 58, 59, 60 and 61 and a decoding circuit 65. The current source circuits 53, 54, 55, 62, 63 and 64 generate currents which are superimposed on each other. Assuming that the amounts of currents generated by the current source circuits 55 and 64 are each I1, the amounts of currents generated by the current source circuits 54 and 63 are each I2 and the amounts of currents generated by the current source circuits 53 and 62 are each I3, the amounts of currents I1 to I3 satisfy the following equation.

$$4 \times I1 = 2 \times I2 = I3$$

The decoding circuit 65 decodes the value of a control signal 115 output by the microcomputer 15, controlling the ON/OFF operations of the switch circuits 56, 57, 58, 59, 60 and 61. More particularly, when the control signal 115 has a value of zero, for example, the switch circuits 56, 57, 58, 59, 60 and 61 are all put in an OFF state to produce a current-offset signal 151 of zero. When the control signal 115 has a value of 7, on the other hand, the switch circuits 56, 57 and 58 are put in an ON state while the switch circuits 59, 60 and 61 are put in an OFF state, producing a current-offset signal 151 equal to (I1+I2+I3) to be added to the signal 152. When the control signal 115 has a value of −7, on the contrary, the switch circuits 56, 57 and 58 are reversely put in an OFF state while the switch circuits 59, 60 and 61 are put in an ON state, producing a current-offset signal 151 equal to (−I1−I2−I3) to be added to the signal 152. In this manner, a positive current offset can be added to the current signal 152 output by the DA converter 51 by putting some of the switch circuits 56, 57 and 58 in an ON state. There are seven ways of putting some of the switch circuits 56, 57 and 58 in an ON state. On the other hand, a negative current offset can be added to the current signal 152 output by the DA converter 51 by putting some of the switch circuits 59, 60 and 61 in an ON state. Again, there are also seven ways of putting some of the switch circuits 59, 60 and 61 in an ON state.

As described above, the present DA circuit 8 can be used for generating the current signal 151 proportional to the value of the control signal 115 ranging from −7 to +7, allowing 15 different offset values to be added to the current signal 152 output by the DA converter 51.

Figure 4:
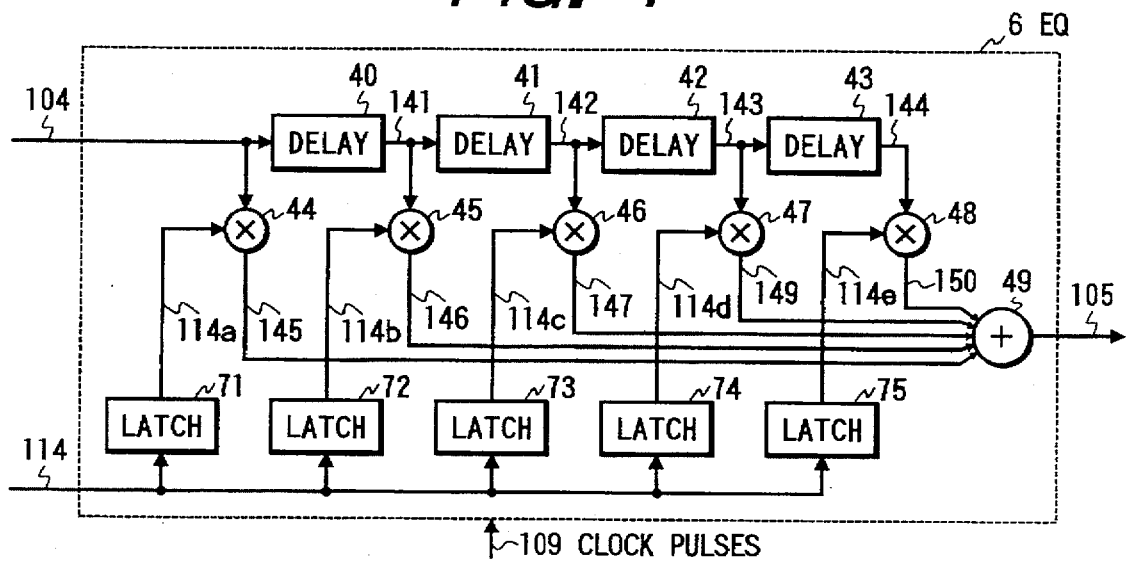
FIG. 4 is a block diagram showing an EQ circuit employed in the first embodiment.

The input/output characteristics of the DA circuit 8 are shown in FIG. 3 wherein reference numeral 301 is the amount of current 107 output by the DA circuit 8 and represented by the vertical axis and reference numeral 302 is the amount of phase shift produced by the PLL controller circuit 7 and represented by the horizontal axis. When the control signal 115 indicating the amount of phase shift has a value of zero, the output 106 of the PLL controller circuit 7, denoted by reference numeral 302, is also zero, generating no offset current. On the other hand, an input/output characteristic indicated by a dashed line in the figure represents a state in which the switch circuit 56 is turned on while the switch circuits 57, 58, 59, 60 and 61 are turned off. In other words, the dashed line represents the control signal 115 having a value of 4. In this case, the amount of current 201 produced by the DA circuit 8 is zero when the output 106 of the PLL controller circuit 7, denoted by reference numeral 302 in the figure, has a value of −2 for example. In the above-noted description, the DA circuit 8 which has a configuration allowing 15 different offset values to be set and with the input-output characteristics therefor have been explained. It should be noted, however, that the number of offset values which can be set may be any number such as 3 or 7 and the like. The EQ circuit 6 is shown in FIG. 4 and comprises delay circuits 40, 41, 42 and 43 each for delaying input data 103 by one clock period of the clock pulses 109, latch circuits 71, 72, 73 and 74 allowing filter-coefficient data thereof to be set in accordance with a control signal 114 output by the microcomputer 15, a multiplier circuit 44 for multiplying the input data 104 by a signal 114a output by the latch circuit 71, a multiplier circuit 45 for multiplying delayed input data 141 output by the delay circuit 40 by a signal 114b output by the latch circuit 72, a multiplier circuit 46 for multiplying delayed input data 142 output by the delay circuit 41 by a signal 114c output by the latch circuit 73, a multiplier circuit 47 for multiplying delayed input data 143 output by the delay circuit 42 by a signal 114d output by the latch circuit 74 and a multiplier circuit 48 for multiplying delayed input data 144 output by the delay circuit 43 by a signal 114e output by the latch circuit 75, and an adder circuit 49 for summing up signals output by the multipliers 44, 45, 46, 47 and 48. In other words, the EQ circuit 6 is a transversal filter wherein proper filter coefficients can be set in the latch circuits 71, 72, 73, 74 and 75 to implement a Nyquist-equation filter. The EQ circuit 6 has such a configuration that values set as the filter coefficients can be adjusted by the control signal 114 output by the microcomputer 15.

The principle of operation of the recording and reproducing apparatus implemented by the aforedescribed embodiment is as follows. For a normal recording operation, data to be recorded, which is transferred from a host computer to the magnetic-disc controller circuit 14, is forwarded by the magnetic-disc controller circuit 14 to the modulation circuit or encoder 83. Data to be recorded 113 coming from the magnetic-disc controller circuit 14 is modulated by the modulation circuit 83 and then transferred to the R/W amplifier 2 by the recording control circuit 19 synchronously with a recording clock signal. A signal 116 output by the R/W amplifier 2 drives the magnetic head 16, recording the data into the magnetic recording medium 1. For a normal reproducing or playback operation, a signal 117 played back by the magnetic head 16 from the magnetic recording medium 1 is amplified by the R/W amplifier 2. A signal 101 output by the R/W amplifier 2 is controlled by the AGC circuit 3 to provide a constant-amplitude signal 102. The signal 102 output by the AGC circuit 3 undergoes a waveform- equalization process in the filter circuit 4 before being supplied to the phase locked loop circuit 11. A signal 103 output by the filter circuit 4 is read in by the phase locked loop circuit 11 at a non-binary state. The signal 103 is converted into a digital signal 104 by the AD circuit 5 employed in the phase locked loop circuit 11. The EQ circuit 6 which serves as a transversal filter carries out a Nyquist-equalization process on the signal 104 output by the AD circuit 5. A signal 105 completing the Nyquist-equalization process in the EQ circuit 6 is checked by the PLL controller circuit 7 for a phase shift. The phase shift, if any, is output as an error signal 106. The value of the error signal 106 output by the PLL controller circuit 7 is converted by the DA circuit 8 into a current value 107 which is then integrated by the integration circuit 9 in a process of conversion into a voltage value 108. The voltage 108 is applied to the VCO circuit 10. The VCO circuit 10 outputs clock pulses 109 having a frequency corresponding to the voltage 108 output by the integration circuit 9. The clock pulses 109 are fed back to the AD circuit 5 for converting the signal 103 output by the filter circuit 4 into the digital signal 104 as a conversion timing signal. The data 105 output by the EQ circuit 6 is also supplied to the [1+D] circuit 18 to undergo a PRML band-limitation process. A signal 110 completing the band- limitation process in the [1+D] circuit 18 is supplied to the Viterbi discrimination circuit 12 to undergo a Viterbi-decoding process. Data 111, a result of the decoding process carried out by the discrimination circuit 12, is supplied to the demodulation circuit 13 to be demodulated into a signal 112. The signal 112 is fed to the magnetic-disc controller circuit 14 for carrying out an error-correction process using the ECC technique on the signal 112 output by the demodulation circuit 13. Playback data 120, a signal output by the magnetic-disc controller circuit 14, is finally transmitted to the host computer.

Figure 5:
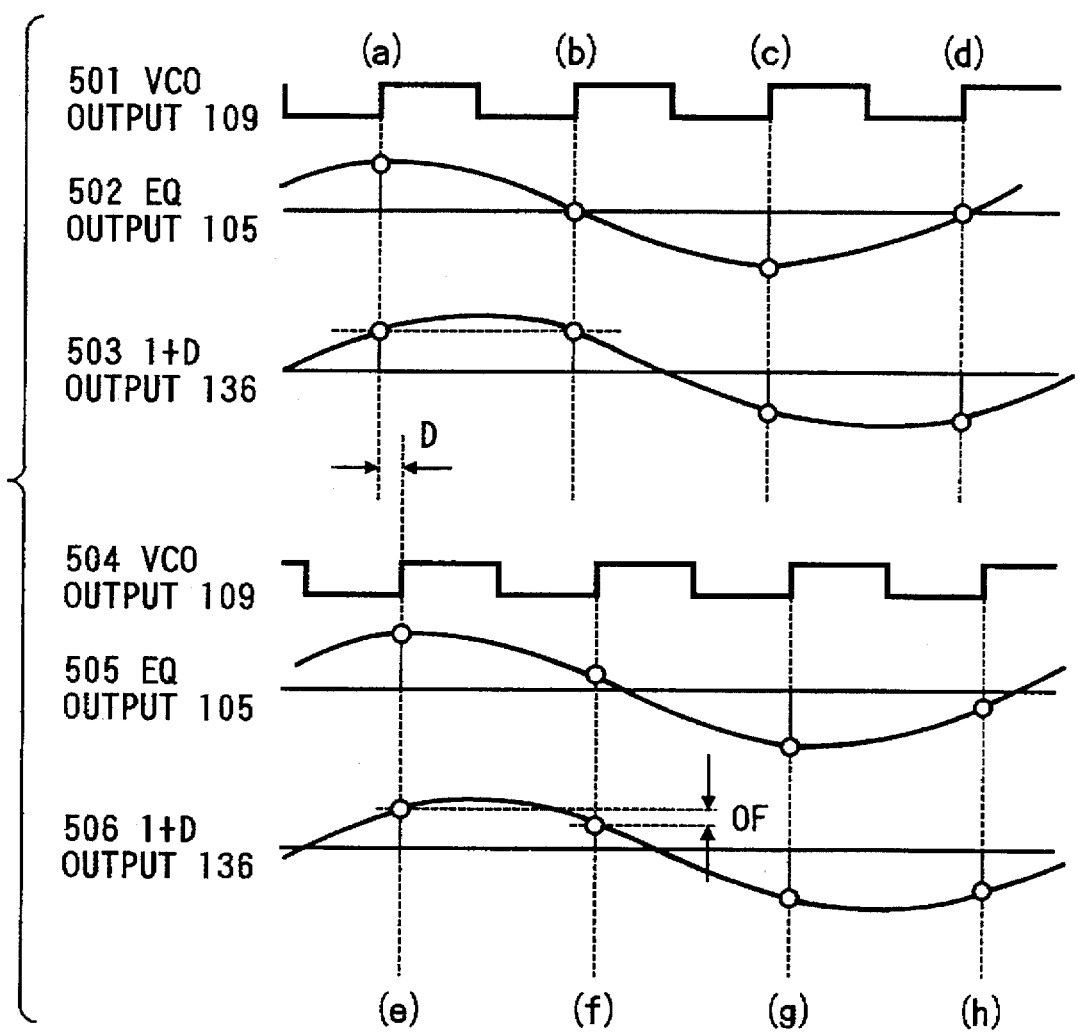
FIG. 5 show timing charts of operational timing of a phase locked loop circuit employed in the first embodiment.

A phase shift generated by the phase locked loop circuit 11 during such a normal reproducing or playback operation is described by reference to FIG. 5 which shows timing charts for a generated phase locked loop pattern corresponding to timing charts denoted by reference numeral 1901 in FIG. 19 as described above. Reference numeral 501 shown in FIG. 5 is the clock pulses 109 output by the VCO circuit 10 whereas reference numeral 502 is the signal 105, a result of the Nyquist-equalization process carried out by the EQ circuit 6 on the playback-signal data 104 which was digitized with timing determined by the clock pulses 109. Control is exercised so that the signal 502 becomes zero at point of times (b) and (d). Reference numeral 503 is a result of a [1+D] process carried out by the [1+D] circuit 36 employed in the PLL controller circuit 7. In the [1+D] process, a current sampled value is added to a sampled value obtained ahead of the current sampled value by one sampling period. Since the signal 503 has a value at a point of time (a) equal to that at the point of time (b), the clock pulses 109 can be considered to be in a synchronized state with the playback signal.

When an offset exists in the AD circuit 5 or the DA converter 8, a shift OF is generated in the signal 506 output by the [1+D] circuit 36. In this case, the clock pulses 109 denoted by reference numeral 504 are no longer synchronized completely with the playback signal, giving rise to a phase shift D. The output 136 of the EQ circuit 6, denoted by reference numeral 504 in the figure, cannot generally be equalized completely as indicated by reference numeral 505, resulting in non-zero values at points of time (f) and (h). It should be noted, however, that the result of the Nyquist-equalization process depends greatly upon the performance of the EQ circuit 6. As a result, an accurate decoding process is difficult to carry out, giving rise to a problem of a reduced margin against jitters in the playback signal in the case of a peak-shift phenomenon observed in read data due to, among other causes, magnetic interference on the disc. Such magnetic interference, in turn, results in jitters in the playback signal.

In order to solve such a problem, the phase of the clock pulses 109 is corrected in advance. By correcting the phase of the clock pulses 109, the timing for converting the signal 103 output by the filter circuit 4 into the digital signal 104 can be set into optimum timing. An optimum phase of the clock pulses 109 is selected so as to maximize the margin of the system against jitters of the playback signal. Therefore, in the case of the first embodiment, the offset of the DA circuit 8 is adjusted by letting the microcomputer 15 execute adjustment operations so as to maximize the margin of the system in advance, typically, prior to the shipment of the recording and playback apparatus. The adjustment operations are described below.

Figure 6:
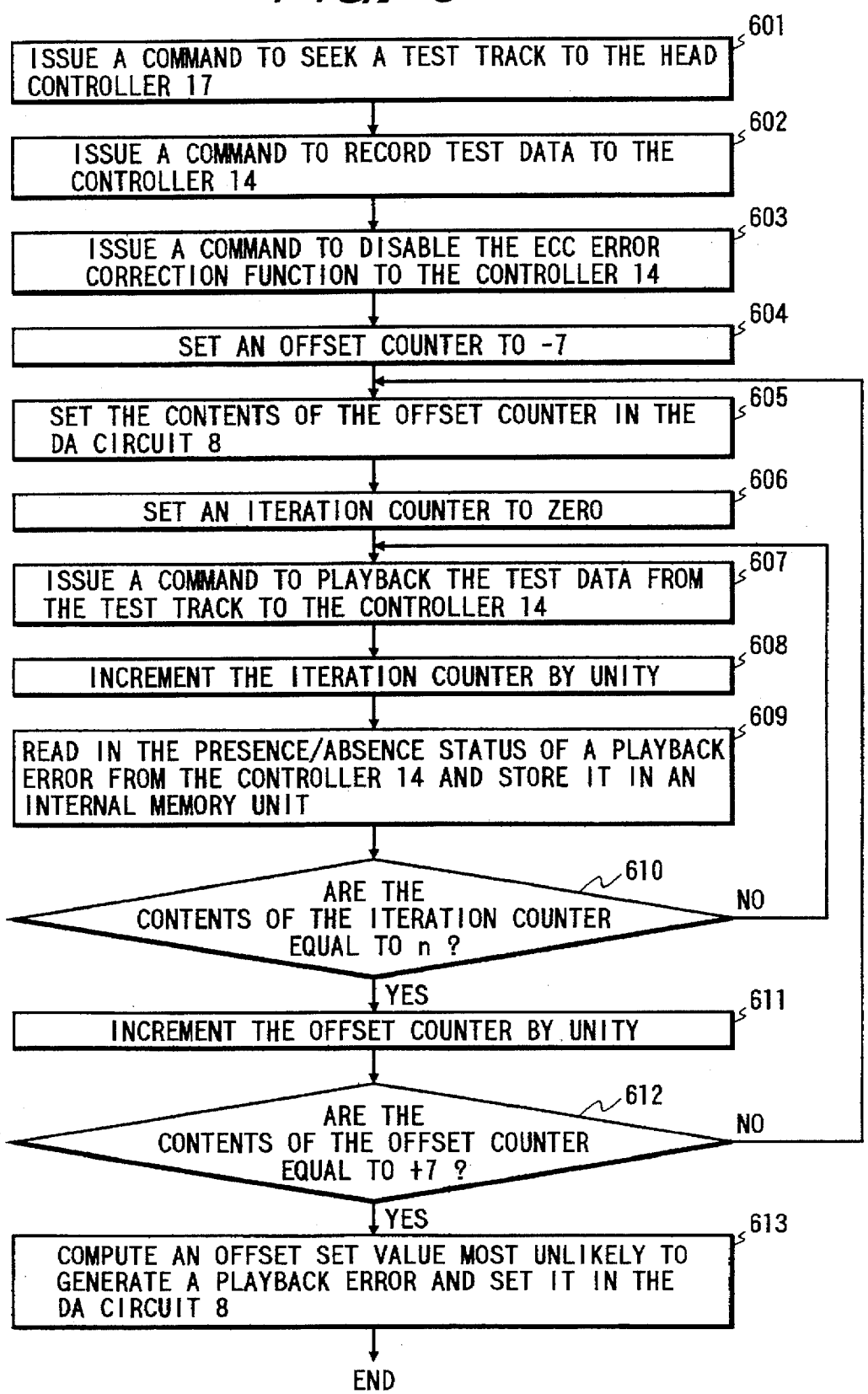
FIG. 6 is a flowchart showing operations carried out by a microcomputer of the first embodiment.
Figure 7:
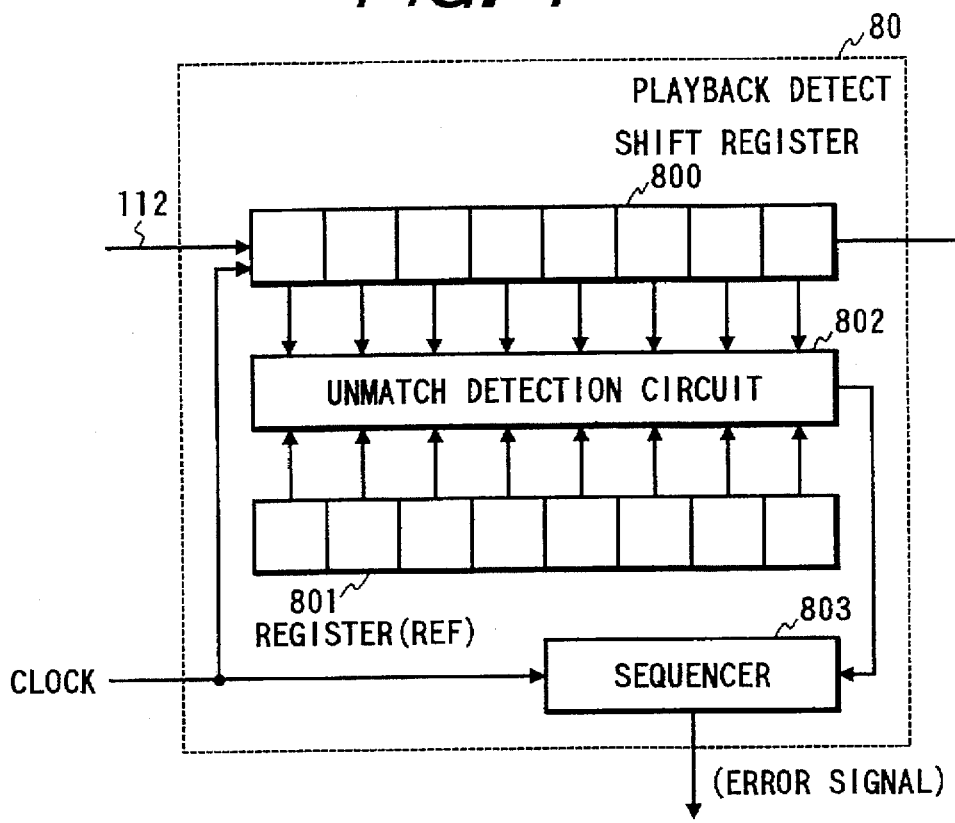
FIG. 7 is a block diagram of a playback detection circuit in accordance with the present invention.
Figure 8:
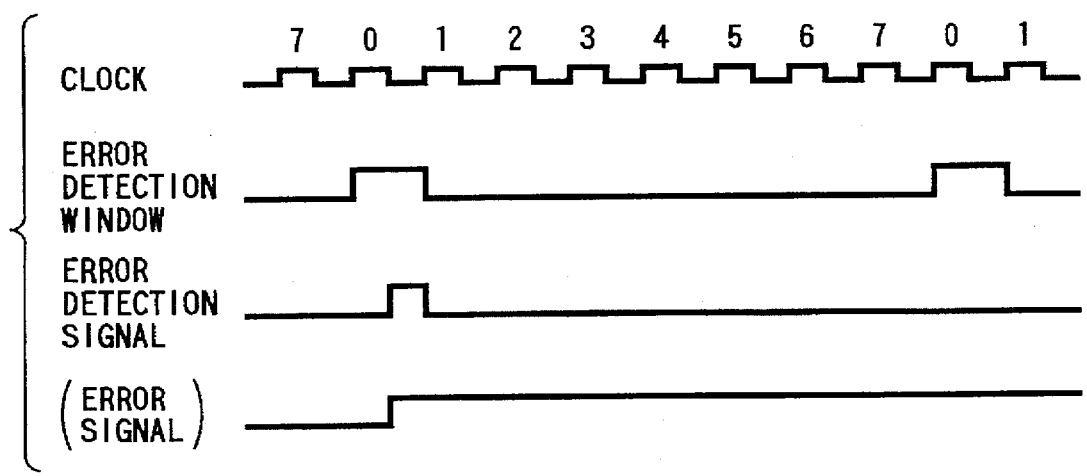
FIG. 8 has timing charts for the playback detection circuit.

A procedure of the adjustment operations is shown in FIG. 6 wherein at step 601, the microcomputer 15 issues a seek command to the head controller circuit 17 for positioning the magnetic head 16 on a test track. Receiving the seek command, the head controller circuit 17 drives an actuator, which is not shown in the figure, to move the magnetic head 16 to the test track. At a subsequent step 602, the microcomputer 15 issues a command to record test data to the magnetic-disc controller circuit 14. Receiving the command, the magnetic-disc controller circuit 14 records the test data into the test track on the magnetic recording medium 1 through the recording or write control circuit 19, the R/W amplifier 2 and the magnetic head 16. At the next step 603, the microcomputer 15 issues a command to disable the ECC error correction function to the magnetic-disc controller circuit 14. In this state, an error generated during the decoding process can be detected correctly. At a subsequent step 604, the microcomputer 15 sets the contents of an offset counter at a value of −7. At a step 605, the microcomputer 15 outputs a value equal to the contents of the offset counter to the offset adjusting unit 52 employed in the DA circuit 8 through the control signal 115. Receiving the control signal 115, the offset adjusting unit 52 sets an offset current corresponding to the contents of the offset counter. At the next step 606, the microcomputer 15 sets an iteration counter to zero. At a step 606, the microcomputer 15 issues a command to play back the test data stored in the test track to the magnetic-disc controller circuit 14. Receiving the command, the magnetic-disc controller circuit 14 reads in the playback data from the magnetic recording medium 1. A playback detection circuit 80 determines whether or not a playback error exists. As shown in FIG. 7, the playback detection circuit 80 includes a shift register 800 receiving the output 112 from the decoder circuit 13 and a clock output as shown in FIG. 8, a register 801 serves as a reference for the played back signal and an unmatch or non-coincidence detection circuit 802 provides an error detection signal to a sequence 803 for generating an error signal utilized by the microcomputer 15 based upon the error detection window and error detection signal as shown in FIG. 8. At a step 608, the microcomputer 15 increments the iteration counter by unity. At a subsequent step 609, the microcomputer 15 stores the existence/non-existence status of the playback error read from the magnetic-disc controller circuit 14 into an internal memory unit. At the next step 610, the microcomputer 15 determines whether or not the contents of the iteration counter have reached a number "n". If the contents of the iteration counter are found at the step 610 to have reached the number "n", the flow continues to a step 611. If the contents of the iteration counter are found at the step 610 not to have reached the number "n", the flow returns to the step 607 to repeat the processings described so far. In this way, the existence of playback errors is checked n times in setting one value of the offset current. This policy of checking the existence of playback errors is based on a consideration that, the more frequently the existence of a playback error is checked, the higher the degree to which the reliability is enhanced.

At the next step 611, the microcomputer 15 increments the contents of the offset counter by unity. At a subsequent step 612, the microcomputer 15 checks whether or not the contents of the offset counter having an initial value of −7 have reached a final value of 7. As described earlier, the offset adjusting means 52 employed in the DA circuit 8 of the embodiment can set 15 different values of the offset current. By checking if the contents of the offset counter with the initial value −7 have reached the final value 7, whether or not the processings for all individual values of the offset current have been completed can be known. If the contents of the offset counter are found at the step 612 to have reached the final value 7, the flow continues to a step 613. If the contents of the offset counter are found at the step 612 not to have reached the final value 7, the flow returns to the step 605 to repeat the processings described so far. As a result, the processings to determine whether or not playback errors exist are executed n times for each value of the offset current, starting with the initial value −7 and ending with the final value 7 of the contents of the offset counter. At the next step 613, the microcomputer 15 computes an offset value, at which a playback error is most unlikely to occur, from a relation between the current offset and the existence/non-existence status of the playback error stored in the internal memory unit. The computed offset value is then set in the offset adjusting unit 52 employed in the DA circuit 8.

Figure 9:
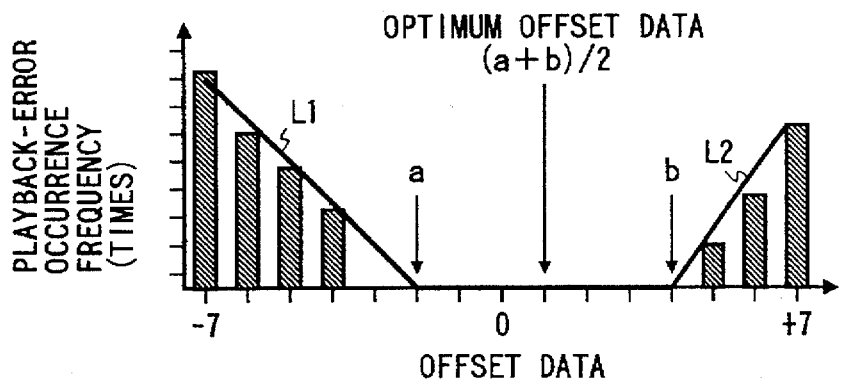
FIG. 9 is a diagram showing a technique for finding an optimum offset value adopted by the first embodiment.

The offset value, at which a playback error is most unlikely to occur, is calculated typically in the following manner. Assume that the relation between the current offset and the existence/non-existence status of the playback error stored in the memory unit of the microcomputer 15 look like a histogram shown in FIG. 9 at a time when the processings carried out at the steps 601 to 612 shown in FIG. 6 are completed, wherein in FIG. 9, the vertical axis represents the frequency of the occurrence of the playback error and the vertical axis represents the contents of the offset counter, and straight lines L1 and L2 are drawn as envelops over the histogram. The straight lines L1 and L2 can be found by using the method of least squares. As an alternative, curves of the second order found by approximation can be drawn instead of the straight lines L1 and L2. Then, optimum offset data equal to an average value of [(a+b)/2] is found, where a and b are offset values represented by cross points of the horizontal axis and the straight lines L1 and L2 respectively. The optimum offset data found in this way is used as the offset value, at which a playback error is most unlikely to occur. The offset value is then set in the offset adjusting unit 52 employed in the DA circuit 8. In the example shown in FIG. 9, a=−2 and b=4 to yield an average value of (−2+4)/2=1. Accordingly, an offset value of unity is set by the microcomputer 15 in the offset adjusting means 52 employed in the DA circuit 8.

Figure 21:
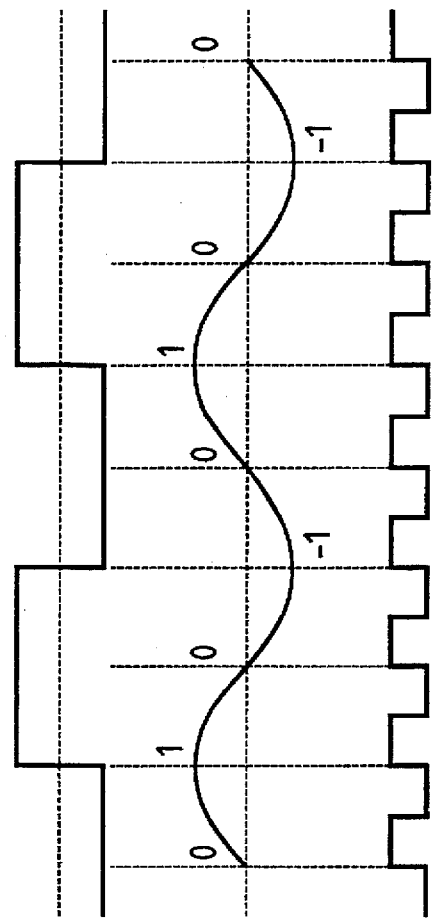
FIG. 21 are timing charts of a phase locked loop pattern and a playback-signal pattern of the phase locked loop pattern.

It should be noted that test data that generates the typical recording current pattern 1901 shown in FIG. 21 can be used as test data of the adjustment operation procedure shown in FIG. 6. If a test pattern is recorded by this recording current pattern, the [1+D] characteristic described earlier will reproduce a signal {0, 1, 0, −1, 0, 1, 0, −1, 0, 1, 0, −1 . . . } as an output 105 of the EQ circuit 6 at playback time. In addition, the test pattern can also be transferred from the host computer to the magnetic-disc controller circuit 14. As an alternative, a special-purpose test-pattern generating apparatus external to the recording and playback apparatus can be employed to transfer a test pattern to the magnetic-disc controller circuit 14. As another alternative, a signal source (or a special-purpose data memory unit) can be embedded in the recording and playback apparatus for generating a test pattern.

In addition, the SCSI (Small Computer System Interface) or the like can be adopted typically as an interface between the magnetic-disc controller circuit 14 and the host computer. The SCSI interface supports a write-and-verify command which writes data, then reads back the data and finally compares the read data to the original data. In other words, a magnetic-disc controller supporting the SCSI interface is equipped with a function to determine whether or not the playback data described earlier is erroneous. As a result, it is no longer necessary to separately provide a playback detection circuit.

According to the description of the adjustment operations given above, the microcomputer 15 disables the ECC error-correction function of the magnetic-disc controller circuit 14. It should be noted, however, that the adjustment operations can also be carried out with the ECC error-correction function kept operational as it is. In addition, the adjustment operations can be carried out with the tracking performance of the head controller circuit 17 degraded so as to deliberately make the playback error likely to occur during the adjustment operations.

As described above, the first embodiment allows adjustment to be carried out so as to maximize the margin of the system against jitters of the playback signal through compensation of the offset of the DA circuit 8.

Figure 10:
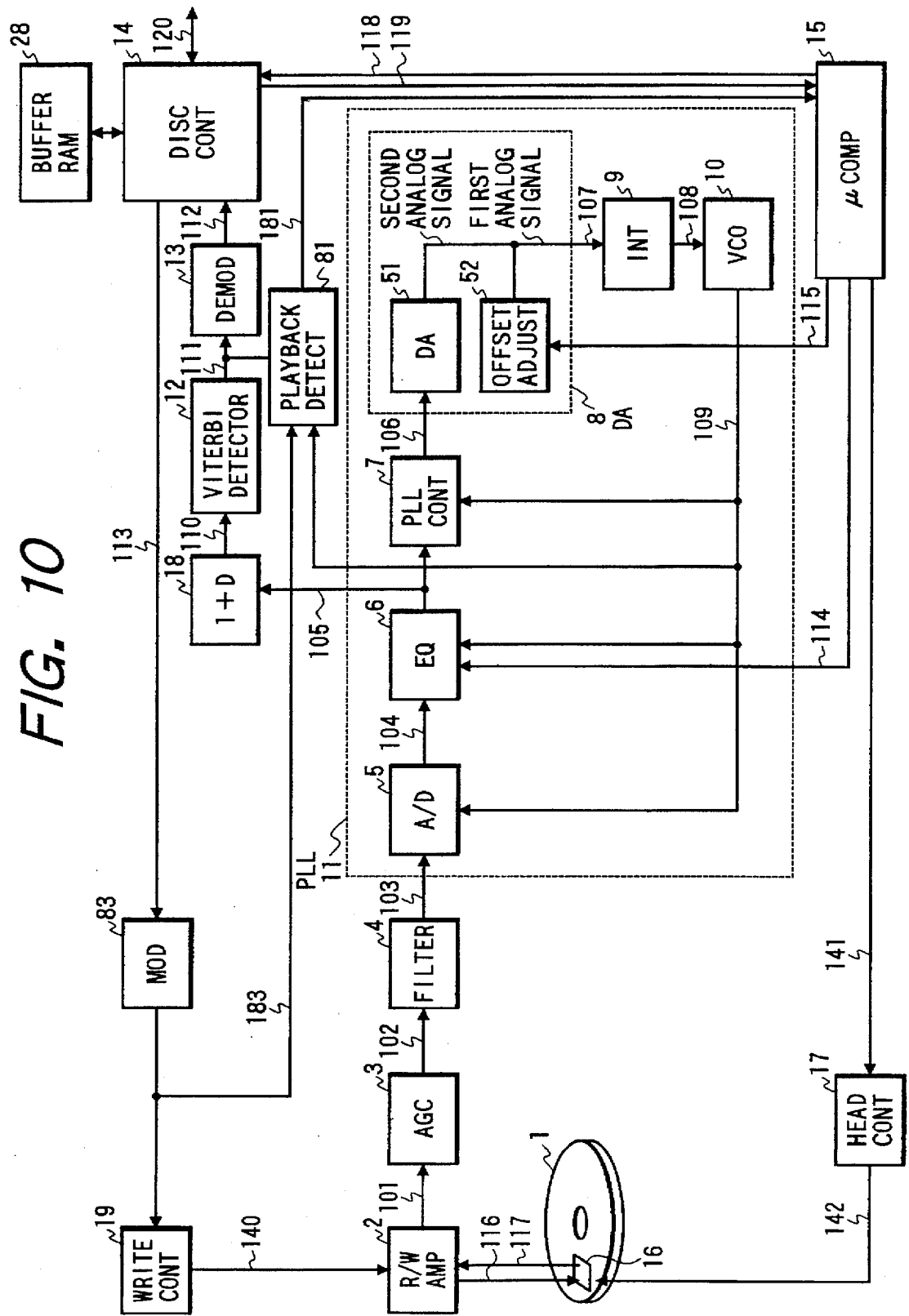
FIG. 10 is a block diagram showing a second embodiment of a recording and reproducing apparatus in accordance with the present invention.

FIG. 10 shows a second embodiment of the present invention implementing a recording and reproducing apparatus and includes a playback-error detecting unit 81 added to the first embodiment of the recording and reproducing apparatus of FIG. 1. When test data recorded in advance in the magnetic recording medium 1 is played back, recording data stored in the buffer RAM circuit 28 is supplied to the modulation circuit 83 through the magnetic-disc controller circuit 14 and the modulation circuit 83 produces modulated recording data 183 to be supplied to the playback-error detecting circuit 81. On the other hand, playback data 111 reproduced from the magnetic recording medium 1 undergoes a Viterbi discrimination process before being supplied to the playback-error detecting unit or circuit 81 with timing synchronized to the clock pulse signal 109. In the playback-error detecting circuit 81, the modulated recording data 183 is compared to the playback data 111 experiencing the Viterbi discrimination process in order to determine whether or not a playback error has been generated.

Figure 11:
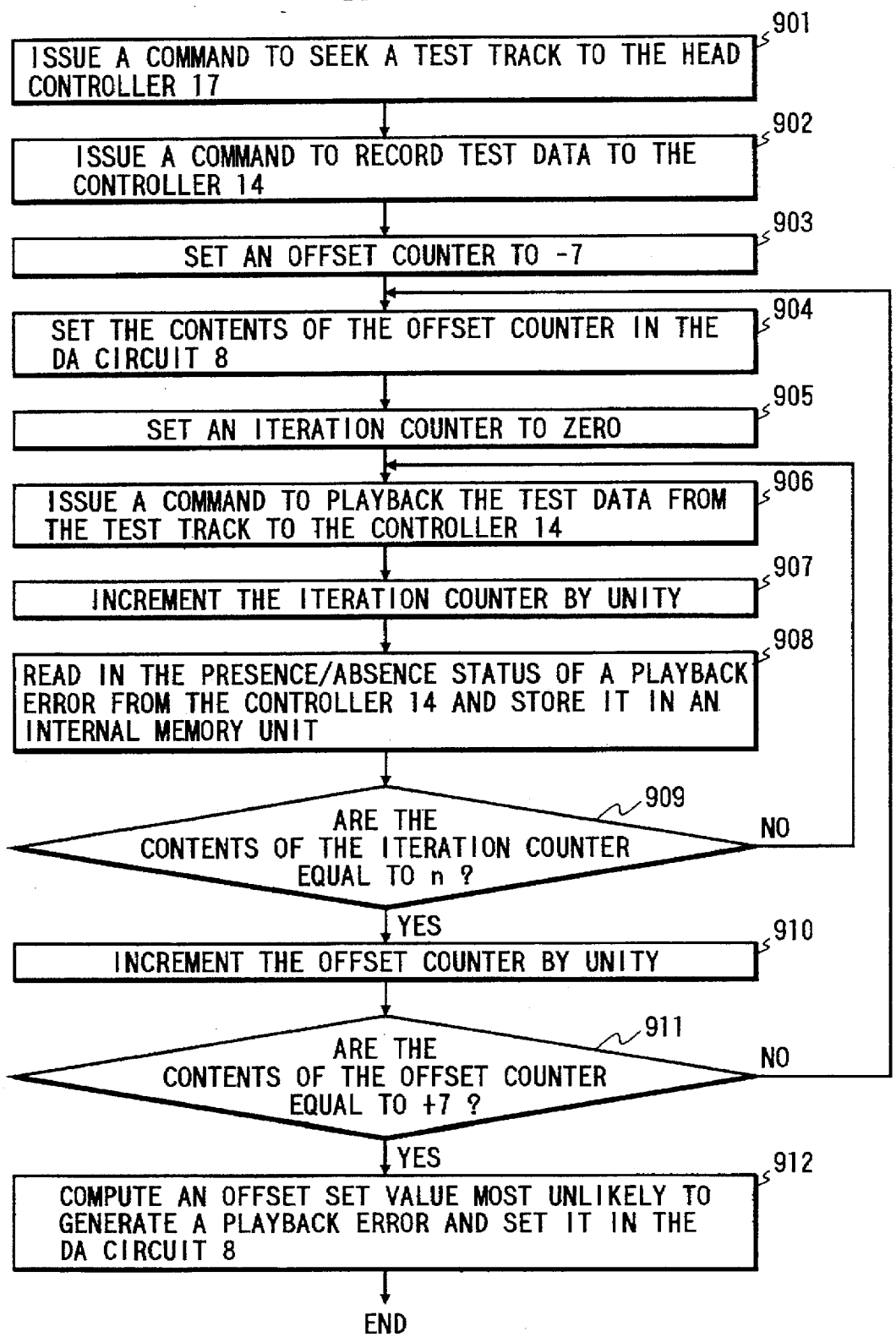
FIG. 11 is a flowchart showing operations carried out by a microcomputer of the second embodiment.

Operations of the microcomputer 15 carried out during the adjustment process are explained by referring to FIG. 11 wherein at a step 901 the microcomputer 15 issues a seek command to the head controller circuit 17 for positioning the magnetic head 16 on a predetermined test track. Receiving the seek command, the head controller circuit 17 drives a predetermined actuator, which is not shown in the figure, to move the magnetic head 16 to the test track. At the next step 902, the microcomputer 15 issues a command to record test data to the magnetic-disc controller circuit 14. Receiving the command, the magnetic-disc controller circuit 14 records the test data into the test track on the magnetic recording medium 1 through the recording or write control circuit 19, the R/W amplifier 2 and the magnetic head 16. At the next step 903, the microcomputer 15 sets the contents of the offset counter at a value of −7. At a subsequent step 904, the microcomputer 15 outputs a value equal to the contents of the offset counter to the offset adjusting unit 52 employed in the DA circuit 8 through the control signal 115. Receiving the control signal 115, the offset adjusting unit 52 sets an offset current corresponding to the contents of the offset counter. At the next step 905, the microcomputer 15 sets the iteration counter to zero. At step 906, the microcomputer 15 issues a command to play back the test data stored in the test track to the magnetic-disc controller circuit 14. The playback-error detecting circuit 81 inputs modulated recording data 183 from the modulation circuit 28 and the playback data 182 from the Viterbi discrimination circuit 12. The playback-error detecting circuit 81 compares the modulated recording data 183 to the playback data 182 in order to determine whether or not a playback error has been generated. At step 907, the microcomputer 15 increments the iteration counter by unity. At a subsequent step 908, the microcomputer 15 stores the existence/non-existence status of a playback error read from the magnetic-disc controller circuit 14 into an internal memory unit. At the next step 909, the microcomputer 15 determines whether or not the contents of the iteration counter have reached a number "n". If the contents of the iteration counter are found at the step 909 to have reached the number "n", the flow continues to a step 910. If the contents of the iteration counter are found at the step 910 not to have reached the number "n", on the other hand, the flow returns to the step 906 to repeat the processings described so far. In this way, the existence of playback errors is checked n times in setting one value of the offset current. This policy of checking the existence of playback errors is based on a consideration that, the more frequently the existence of playback errors is checked, the higher the degree to which the reliability is enhanced.

At the next step 910, the microcomputer 15 increments the contents of the offset counter by unity. At a subsequent step 911, the microcomputer 15 checks whether or not the contents of the offset counter having an initial value of −7 have reached a final value of 7. As described earlier, the offset adjusting unit 52 employed in the DA circuit 8 of the embodiment can set 15 different values of the offset current. By checking if the contents of the offset counter with the initial value −7 have reached the final value 7, whether or not the processings for all individual values of the offset current have been completed can be known. If the contents of the offset counter are found at the step 911 to have reached the final value 7, the flow continues to a step 912. If the contents of the offset counter are found at the step 911 not to have reached the final value 7, on the other hand, the flow returns to the step 904 to repeat the processings described so far. As a result, the processings to determine whether or not playback errors exist are executed n times for each value of the offset current, starting with the initial value −7 and ending with the final value 7 of the contents of the offset counter.

At the next step 912, the microcomputer 15 computes an offset value, at which a playback error is most unlikely to occur, from a relation between the current offset and the existence/non-existence status of the playback error stored in the internal memory unit. The computed offset value is then set in the offset adjusting unit 52 employed in the DA circuit 8. The offset value, at which a playback error is most unlikely to occur, is calculated in the same manner as that adopted in the first embodiment. With the second embodiment, the same results as those of the first embodiment can be obtained.

Figure 12:
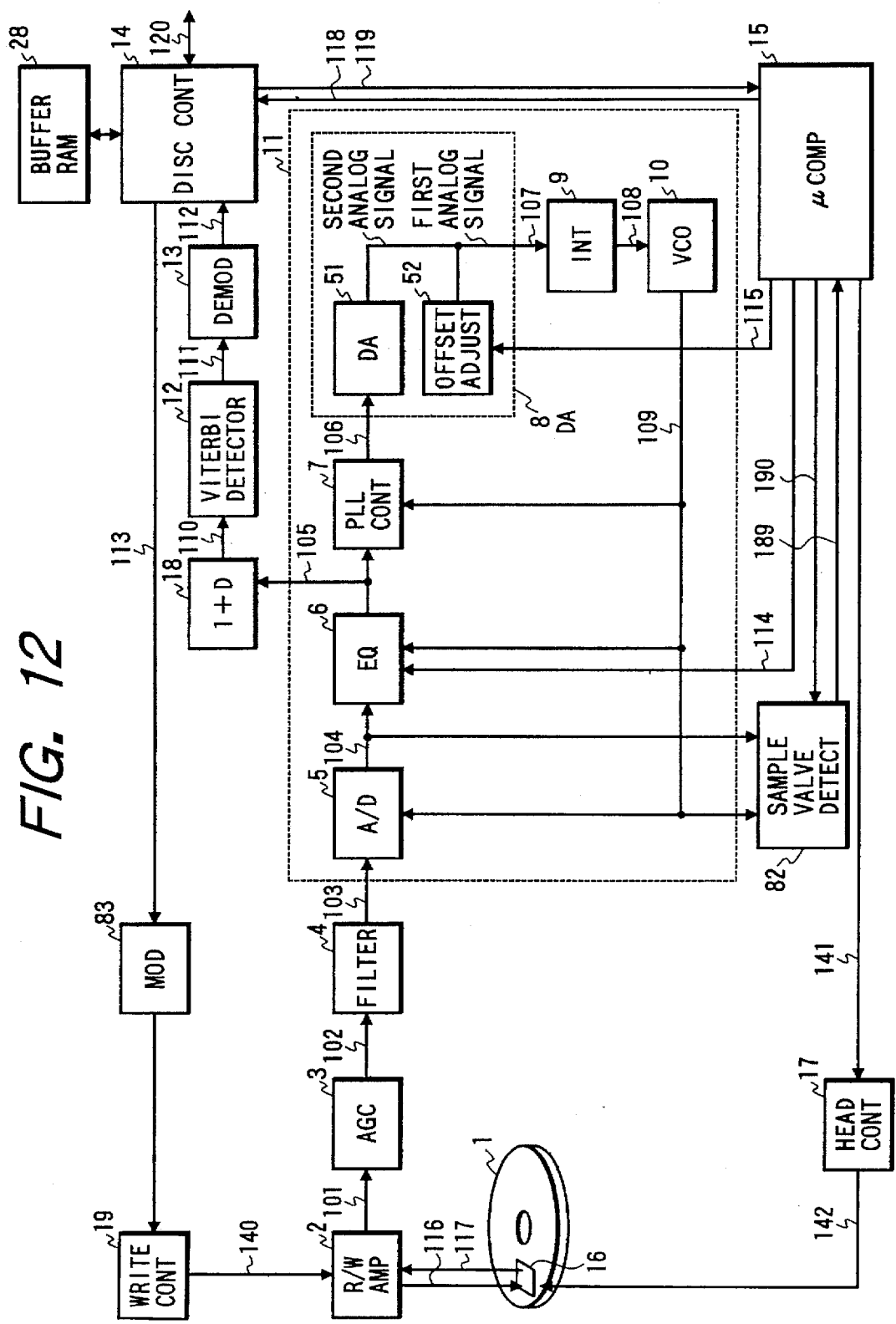
FIG. 12 is a block diagram showing a third embodiment of a recording and reproducing apparatus in accordance with the present invention.

A third embodiment of the present invention implementing a recording and reproducing apparatus is shown in FIG. 12, wherein a sample-value detecting unit 82 is added to the first embodiment of the recording and reproducing apparatus of FIG. 1 described earlier. The sampled-value detecting unit 82 comprises a one-fourth frequency divider, an AND logic processing circuit and a latch circuit. The one-fourth frequency divider divides the frequency of the clock pulses 109 output by the VCO circuit 10 by four, generating a signal with a frequency equal to one-fourth of the frequency of the clock pulses 109. The signal having the one-fourth frequency is supplied to the AND logic processing circuit along with a detection signal 190 received from the microcomputer 15 to undergo an AND logic process therein. A latch signal, the result of the AND logic process, is generated for use in latching the signal 104 output by the AD circuit 5 into the latch circuit.

Figure 13:
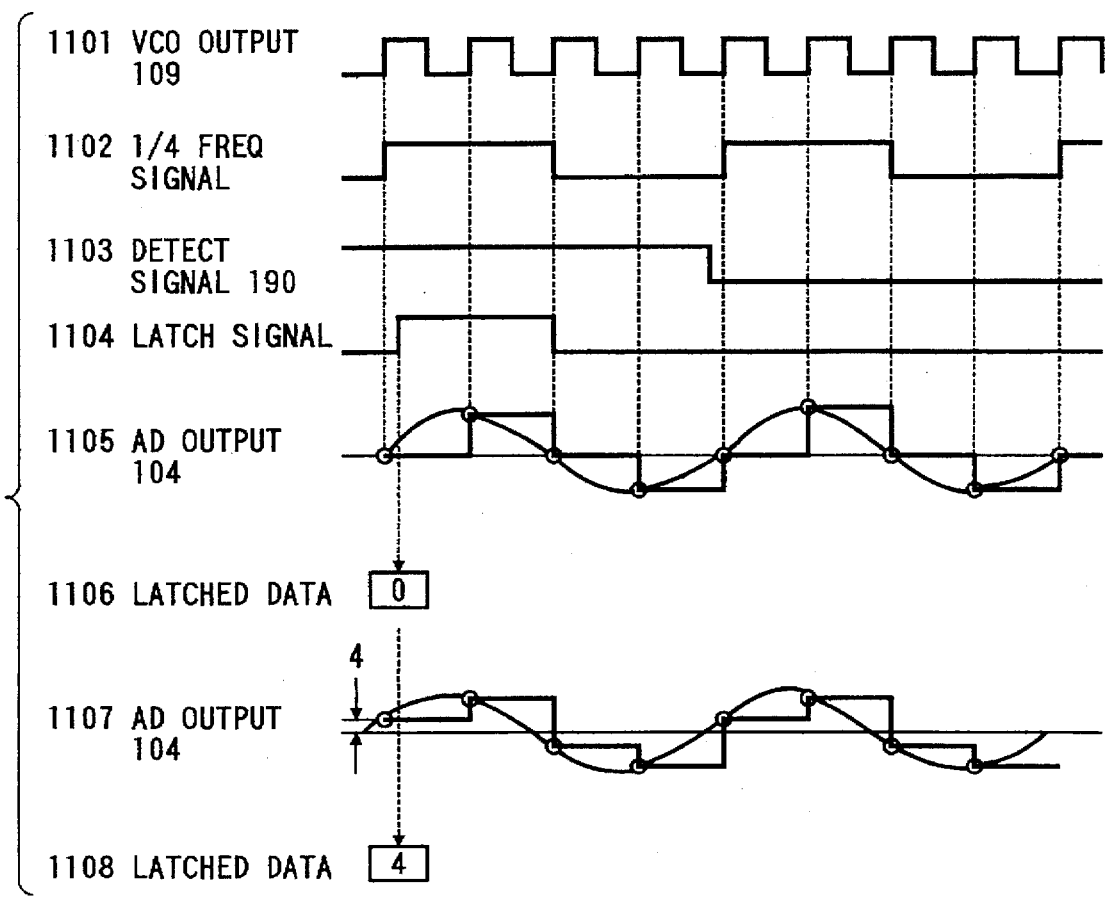
FIG. 13 are timing charts showing operational timing of a sample-value detecting unit of the third embodiment.

FIG. 13 shows these operations wherein reference numeral 1101 is the clock pulse signal 109 output by the VCO circuit 10 whereas reference numeral 1102 is the signal having a frequency equal to one-fourth of the frequency of the clock pulse signal 109. Reference numeral 1103 is the detection signal 190 received from the microcomputer 15. A sampled value of the signal 104 output by the AD circuit 5 is read in during the "H"-level period of the detection signal 190. Reference numeral 1104 is the latch signal, a signal resulting from the AND logic process carried on the signals 1102 and 1103. Reference numeral 1105 is the signal 104 output by the AD circuit 5 whereas reference numeral 1106 denotes latched data which is obtained by latching the signal 1105 output by the AD circuit 5 on the rising edge of the latch signal 1104. Later on, the latch data 1106 is read by the microcomputer 15. The signal 1105 shown in the figure is a typical signal for a case in which the phases of the playback signal and the timing clock pulse signal are synchronized with each other. In such a case, the value of the latched data 1106 is zero.

Reference numeral 1107 is a typical signal 104 output by the AD circuit 5 for a case in which the phases of the playback signal and the timing clock pulse signal are not synchronized with each other. In such a case, the value of latch data 1108 is four. That is to say, when the phases of the playback signal and the timing clock pulse signal are synchronized with each other, the value of the latched data is zero and, when the phases of the playback signal and the timing clock pulse signal are not synchronized with each other, on the other hand, the value of the latched data is either a positive number or a negative number.

Figure 14:
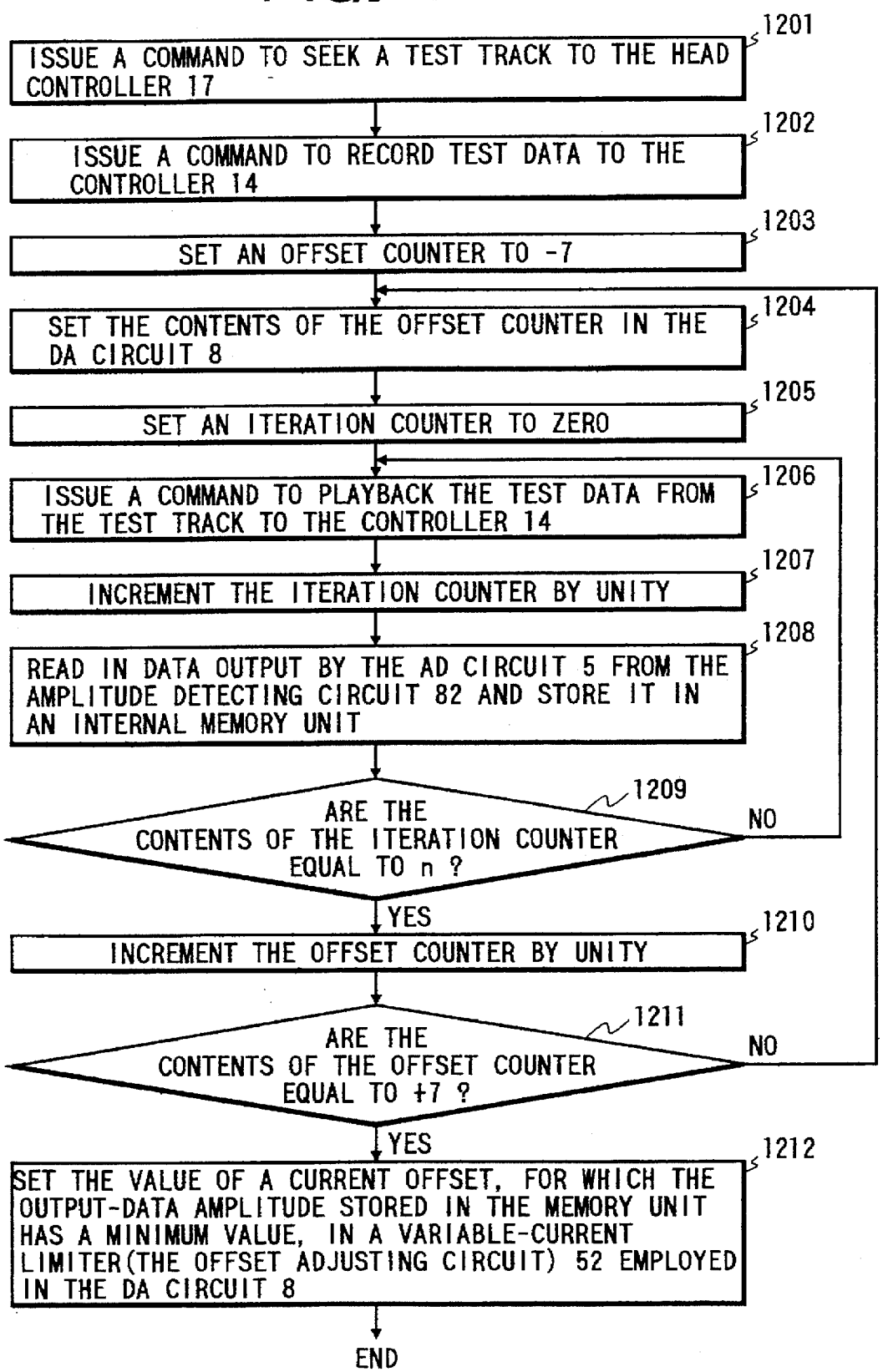
FIG. 14 is a flowchart showing operations carried out by a microcomputer of the third embodiment.

Adjustment operations of the microcomputer 15 employed in the third embodiment are described by reference to FIG. 14 wherein at a step 1201, the microcomputer 15 issues a seek command to the head controller circuit 17 for positioning the magnetic head 16 on a predetermined test track. Receiving the seek command, the head controller circuit 17 drives an actuator to move the magnetic head 16 to the test track. At the next step 1202, the microcomputer 15 issues a command to record test data to the magnetic-disc controller circuit 14. Receiving the command, the magnetic-disc controller circuit 14 records the test data into the test track on the magnetic recording medium 1 through the recording control circuit 19, the R/W amplifier 2 and the magnetic head 16. At the next step 1203, the microcomputer 15 sets the contents of the offset counter at a value of −7. At a subsequent step 1204, the microcomputer 15 outputs a value equal to the contents of the offset counter to the offset adjusting unit 52 employed in the DA circuit 8 through the control signal 115. Receiving the control signal 115, the offset adjusting unit 52 sets an offset current corresponding to the contents of the offset counter. At the next step 1205, the microcomputer 15 sets the iteration counter to a zero. At a subsequent step 1206, the microcomputer 15 issues a command to play back the test data stored in the test track to the magnetic-disc controller circuit 14. At a step 1207, the microcomputer 15 increments the iteration counter by unity. At a subsequent step 1208, the microcomputer 15 sets a detection level 190 to an "H" level, letting the sampled-value detecting circuit 82 latch in a sampled value from the signal 104 output by the AD circuit 5. The microcomputer 15 then reads latched data from the sampled-value detecting circuit 82, storing the latched data into an internal memory unit. At the next step 1209, the microcomputer 15 determines whether or not the contents of the iteration counter have reached a number "n". If the contents of the iteration counter are found at the step 1209 to have reached the number "n", the flow continues to a step 1210. If the contents of the iteration counter are found at the step 1209 not to have reached the number "n", the flow returns to the step 1206 to repeat the processings described so far. In this way, the existence of playback errors is checked n times in setting one value of the offset current. This policy of checking the existence of playback errors is based on the fact that, taking jitters of the clock pulses 109 and the like into consideration, latched data does not necessarily indicate a disorder in the phase locked loop accurately. Therefore, the processings are repeated n times in order to find an average value from a plurality of latched-data samples.

At the next step 1210, the microcomputer 15 increments the contents of the offset counter by unity. At a subsequent step 1211, the microcomputer 15 checks whether or not the contents of the offset counter having an initial value of −7 have reached a final value of 7. As described earlier, the offset adjusting unit 52 employed in the DA circuit 8 of the embodiment can set 15 different values of the offset current. By checking if the contents of the offset counter with the initial value −7 have reached the final value 7, whether or not the processings for all individual value of the offset current have been completed can be determined. If the contents of the offset counter are found at the step 1211 to have reached the final value 7, the flow continues to a step 1212. If the contents of the offset counter are found at the step 1211 not to have reached the final value 7, on the other hand, the flow returns to the step 1204 to repeat the processings described so far. As a result, the processings to determine whether or not playback errors exist are executed n times for each value of the offset current, starting with the initial value −7 and ending with the final value 7 of the contents of the offset counter. At the next step 1212, the microcomputer 15 sets a current offset in the offset adjusting unit 52 employed in the DA circuit 8. The current offset set in the offset adjusting means 52 employed in the DA circuit 8 is a current offset for which the average of output-data amplitudes stored in the internal memory unit has a value closest to zero.

Figure 15:
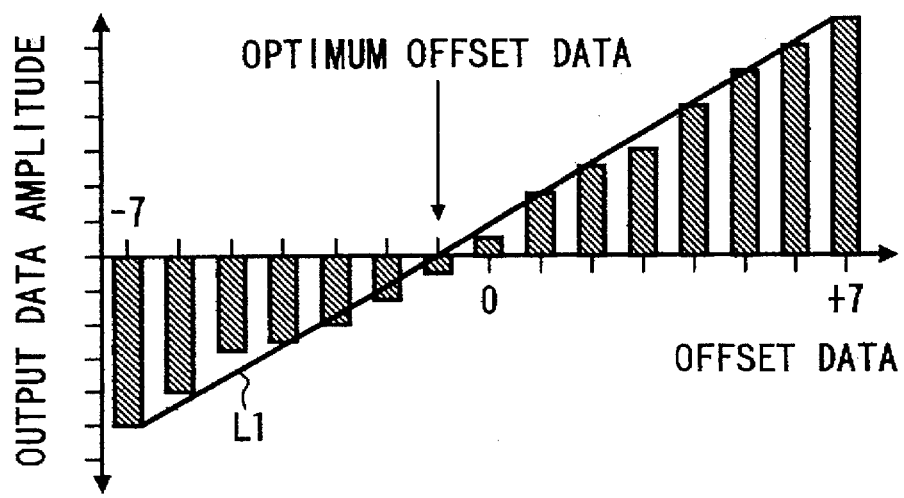
FIG. 15 is a diagram showing a technique for finding an optimum offset value adopted by the third embodiment.

A technique of calculating an offset value that corresponds to an average value of output-data amplitudes closest to zero is described by referring to FIG. 15. A horizontal axis shown in the figure represents the contents of the offset counter whereas a vertical axis represents the average value of results of measuring the output-data amplitude n times. FIG. 15 is a histogram showing a relation between the average value of results of measuring the output-data amplitude n times stored in the internal memory unit of the microcomputer 15 and the offset data as described above. The histogram shown in the figure is obtained at a point of time at which the operations carried out at the steps 1201 to 1211 shown in FIG. 14 are completed. A straight line L1 is drawn as an envelop over the histogram. The straight line L1 can be found by using the method of least squares. As an alternative, a curve of the second order found by approximation can be drawn instead of the straight line L1. Then, a value represented by a cross point of the horizontal axis and the straight line L1 drawn in this way is used as the optimum offset data, the value of which is set in the offset adjusting unit 52 employed in the DA circuit 8. In the example shown in FIG. 15, the value represented by the cross point of the horizontal axis and the straight line L1 is −1. Accordingly, the microcomputer 15 sets the value −1 in the offset adjusting unit 52 employed in the DA circuit 8. With the third embodiment, the same results as those of the first embodiment can be obtained.

Figure 16:
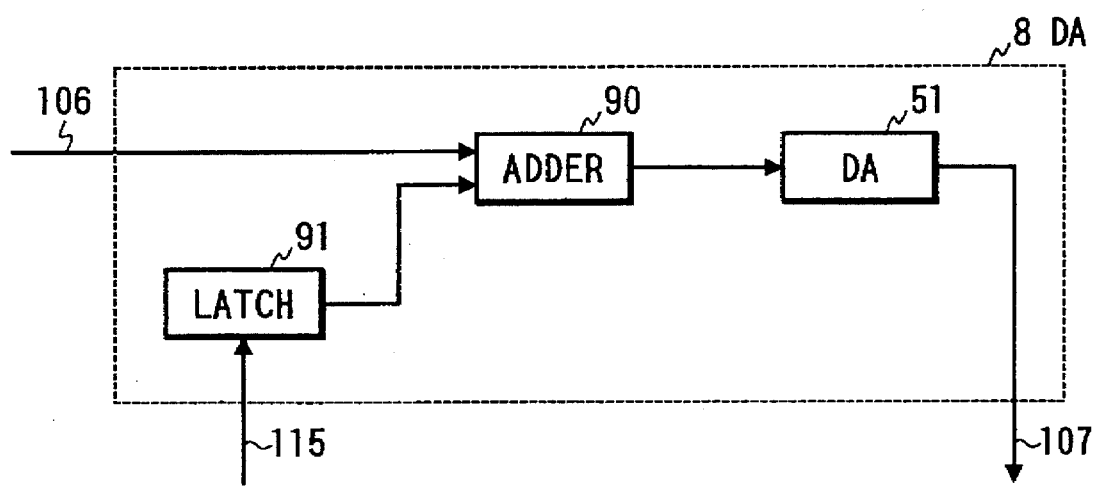
FIG. 16 is a block diagram showing another typical DA circuit employed in embodiments of the present invention.
Figure 17:
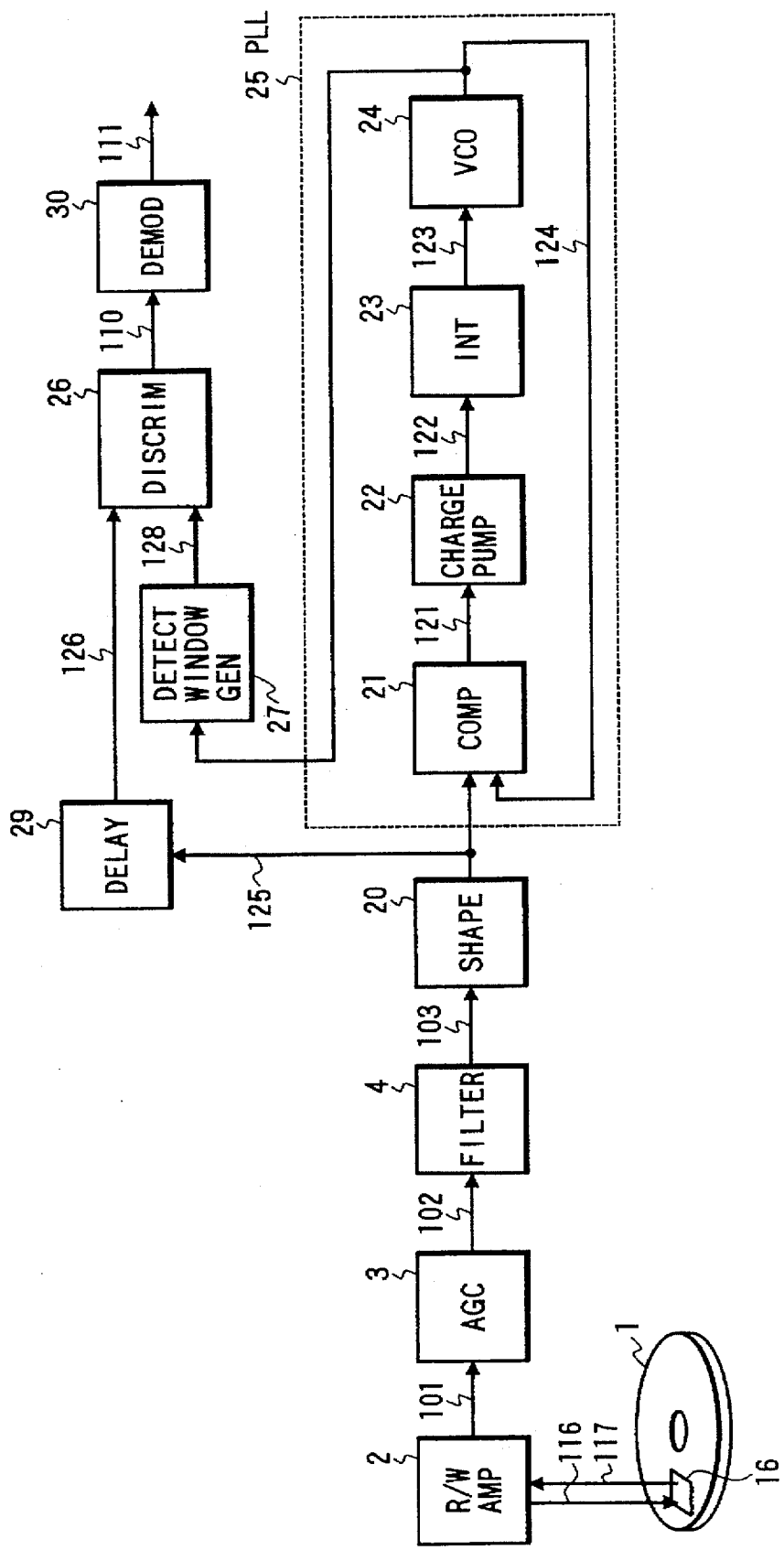
FIG. 17 is a block diagram showing a conventional recording and reproducing apparatus.
Figure 18:
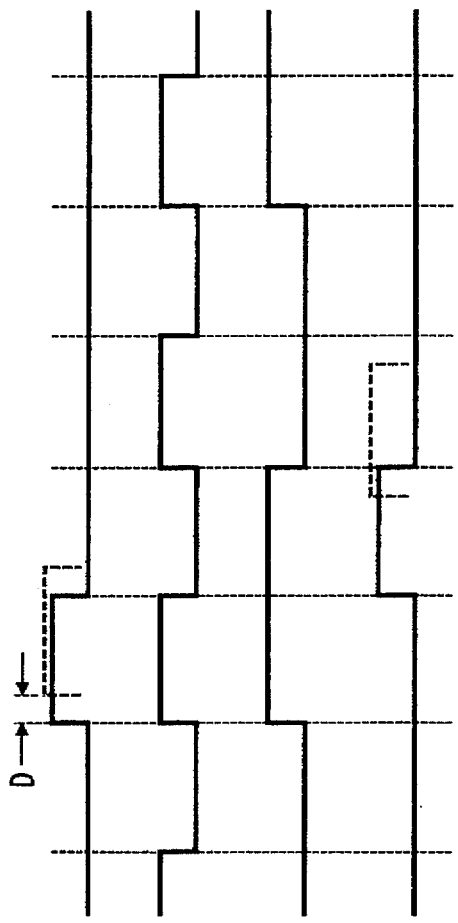
FIG. 18 are timing charts showing the principle of operation of a conventional discrimination circuit.

The DA circuit 8 employed in the first to third embodiments described above adjusts the current offset by adding a current 151 output by the offset adjusting unit 52 to a current 152 output by the DA converter 51. It should be noted, however, that a circuit having a configuration shown in FIG. 16 can also be used as the DA circuit 8 as well. As shown in FIG. 16, the DA circuit 8 comprises a latch circuit 91 for setting digital offset data in accordance with the control signal 115 received from the microcomputer 15, an adder circuit 90 for adding the digital offset data output by the latch circuit 91 to input data 106 and a DA converter 51 for converting data output by the adder circuit 90 into an analog current value. Even with the DA circuit with the configuration shown in the figure, the same offset adjustment as that of the DA circuit 8 shown in FIG. 2 can be carried out. In addition, the microcomputer 15 sets constants of the transversal filter of the EQ circuit 6 through the control signal 114 as described earlier. At that time, the constants of the transversal filter of the EQ circuit 6 are adjusted so as to eliminate any deviation of the signal 104 output by the AD circuit 5 from Nyquist's condition. The constants of the transversal filter of the EQ circuit 6 can be adjusted as follows.

Prior to the adjustment operations carried out by the first to third embodiments described earlier, the deviation of the signal 104 output by the AD circuit 5 from Nyquist's condition is big. It may thus be impossible to obtain constants of the transversal filter which satisfy Nyquist's condition even if the characteristic of the EQ circuit 6 is adjusted. Taking this fact into consideration, the constants of the transversal filter of the EQ circuit 6 are adjusted in the same way as the conventional technique. It should be noted that, in this case, if test data implementing the same pattern as the phase locked loop pattern shown in FIG. 21 is used, problems caused by adjustment prior to the setting of the constants of the transversal filter of the EQ circuit 6 will not be encountered. This is because this pattern is not affected by an inequality characteristic of the EQ circuit 6. It should be noted that the phase locked loop pattern shown in FIG. 21 is recorded on each sector of a magnetic recording medium during the formatting of the magnetic recording medium. If this phase locked loop pattern is also utilized in the adjustment operations carried out by the first to third embodiments described above, the process to record test data can be eliminated, allowing the timing of sampling to be adjusted with ease.

In addition, the phase locked loop circuit employed by the first to third embodiments described above can be adjusted every time the power is turned on or only one time prior to shipment. If the phase synchronizing circuit is adjusted every time the power is turned on, a proper value set by the microcomputer 15 in the offset adjusting unit 52 utilizing of the technique adopted by the embodiments described earlier is preserved till the power is turned off, giving rise to no problems. If the phase locked loop circuit is adjusted only one time prior to shipment, a proper value set by the microcomputer 15 in the offset adjusting unit 52 needs to be stored in a predetermined non-volatile storage unit. As the non-volatile unit, the magnetic recording medium 1 can be used. As an alternative, a ROM (Read-Only Memory) unit, into which data can be electrically written, can also be used as well. In this case, the microcomputer 15 reads out the proper value from the non-volatile storage unit described above, setting the value in the offset adjusting unit 52 when the power is turned on.

A phase locked loop circuit adopting the PR technique has been described so far. It should be noted, however, that the embodiments described above can each be applied as well to any ordinary phase synchronizing circuit for generating a clock signal which is synchronized with an input signal through processing of digital signals. In addition, the embodiments can also be applied as well to phase synchronizing circuits used in recording and reproducing apparatuses employing other types of recording medium such as optical recording media and optomagnetic recording media and to phase locked loop circuits used for playing back data received by communication/transmission apparatuses. When applied to a communication/transmission apparatus, test data is supplied from an external source as received data during the adjustment operations described before.

The above-described embodiments of the present invention allow the phase locked loop circuit employed in the magnetic recording and playback apparatus adopting the PR technique to be adjusted in advance so as to maximize the margin against jitters of a playback signal due to, among other causes, a peak-shift phenomenon or noise occurring in the disc, the magnetic head and the R/W amplifier. As a result, the timing for sampling a playback signal can be controlled to vary within an appropriate range, allowing an error-free playback signal to be generated.

As described, the present invention provides a phase locked loop circuit for generating a clock signal synchronized in phase with an input signal by processing of digital signals wherein the offset thereof can be adjusted in advance with ease, and a recording and reproducing apparatus equipped with such a phase synchronizing circuit.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A recording and reproducing apparatus comprising:
   a recording medium having a recorded test recording signal thereon;
   read means for reading out said test recording signal from said recording medium;
   a phase locked loop circuit for generating a clock signal with a phase synchronized to said test recording signal read out from said recording medium, said phase locked loop circuit including a voltage controlled oscillator for generating a clock signal with a frequency determined by a voltage control signal supplied to said voltage controlled oscillator, an AD-conversion circuit for sampling said test recording signal with a timing determined by said clock signal and for converting sampled values into digital data, a phase locked loop control circuit for generating control data with values representing values of said digital data, and a DA-conversion circuit having an adjustable conversion characteristic for converting said control data into a first analog signal and for outputting said first analog signal to said voltage controlled oscillator as said voltage control signal;
   demodulation means for demodulating data of said test recording signal read out by said read means using said clock signal to generate playback data; and
   control means including means for controlling said read means to read out from said recording medium said test recording signal of a predetermined test pattern data recorded on said recording medium, means for controlling said demodulation means to reproduce test playback data from the predetermined test pattern data of said test recording signal read by said read means, means for comparing said test playback data to said predetermined test pattern data, means for determining whether or not contents of said test playback data are erroneous, and means for adjusting the conversion characteristic of said DA-conversion circuit based at least on a result of the determination whether or not the contents of the test playback data are erroneous.

2. A recording and reproducing apparatus according to claim 1, wherein said control means changes the conversion characteristic of said DA-conversion circuit to predetermined characteristics, controls said read means to read out from said recording means said test recording signal, determines optimum conversion characteristic of said DA conversion circuit based on the result of determination of each predetermined characteristic, and adjusts the conversion characteristic of said DA conversion circuit to the optimum conversion characteristic.

3. A recording and reproducing apparatus according to claim 1, wherein said DA-conversion circuit comprises a DA converter for converting said control data into a second analog signal, and an offset adjusting circuit for providing an offset with an adjusted level to generate said first analog signal in accordance with said second analog signal output by said DA converter.

4. A recording and reproducing apparatus according to claim 1, wherein said DA-conversion circuit comprises an offset adjusting circuit for providing an offset adjusted by said control means, and a DA converter responsive to said offset and said control data for outputting said first analog signal.

5. A recording and reproducing apparatus according to claim 1, wherein said demodulation means include equalization means for performing predetermined waveform-equalization processing on recorded data of said test recording signal read out by said read means.

6. A recording and reproducing apparatus according to claim 5, wherein said control means adjusts a characteristic of said equalization means in accordance with a playback characteristic of said data after a conversion characteristic of said DA-conversion circuit has been adjusted.

7. A recording and reproducing apparatus comprising:
   a recording medium having a recorded test recording signal thereon;
   read means for reading out said test recording signal from said recording medium;
   a phase locked loop circuit for generating a clock signal with a phase synchronized to said test recording signal read out from said recording medium, said phase locked loop circuit including a voltage controlled oscillator for generating a clock signal with a frequency determined by a voltage control signal supplied to said voltage controlled oscillator, an AD-conversion circuit for sampling said test recording signal with a timing determined by said clock signal and for converting sampled values into digital data, a phase locked loop control circuit for generating control data with values representing values of said digital data, and a DA-conversion circuit having an adjustable conversion characteristic for converting said control data into a first analog signal and for outputting said first analog signal to said voltage controlled oscillator as said voltage control signal;
   demodulation means for demodulating data of said test recording signal read out by said read means using said clock signal to generate playback data; and
   means for driving said read means to read out from said recording medium said test recording signal of predetermined test pattern data recorded on said recording medium; and
   control means including means for controlling said demodulation means to demodulate said predetermined test pattern data, means for comparing the demodulated recording data to recording data of said test recording signal, means for determining whether or not contents of the test playback data are erroneous, and means for adjusting the conversion characteristic of said DA-conversion circuit based at least on a result of the determination whether or not the contents of the test playback data are erroneous.

8. A recording and reproducing apparatus according to claim 1, wherein said control means changes the conversion characteristic of said DA-conversion circuit to predetermined characteristics, controls said read means to read out from said recording means said test recording signal conveying predetermined test pattern data recorded on said recording means, determines optimum conversion characteristic of said DA conversion circuit based on the result of determination of each predetermined characteristic, and adjusts the conversion characteristic of said DA conversion circuit to the optimum conversion characteristic.

9. A recording and reproducing apparatus according to claim 7, wherein said DA-conversion circuit comprises a DA converter for converting said control data into a second analog signal, and an offset adjusting circuit for providing an offset with an adjusted level to generate said first analog signal in accordance with said second analog signal output by said DA converter.

10. A recording and reproducing apparatus according to claim 7, wherein said DA-conversion circuit comprises an offset adjusting circuit for providing an offset adjusted by said control means, and a DA converter responsive to said offset and said control data for outputting said first analog signal.

11. A recording and reproducing apparatus according to claim 7, wherein said demodulation means include equalization means for performing predetermined waveform-equalization processing on recorded data of said test recording signal read out by said read means.

12. A recording and reproducing apparatus according to claim 11, wherein said control means adjusts a characteristic of said equalization means in accordance with a playback characteristic of said data after a conversion characteristic of said DA-conversion circuit has been adjusted.

13. A recording and reproducing apparatus comprising:
a recording medium having a recorded test recording signal thereon;
read means for reading out said test recording signal from said recording medium;
a phase locked loop circuit for generating a clock signal with a phase synchronized to said test recording signal read out from said recording medium, said phase locked loop circuit including a voltage controlled oscillator for generating a clock signal with a frequency determined by a voltage control signal supplied to said voltage controlled oscillator, an AD-conversion circuit for sampling said test recording signal with a timing determined by said clock signal and for converting sampled values into digital data, a phase locked loop control circuit for generating control data with values representing values of said digital data, and a DA-conversion circuit having an adjustable conversion characteristic for converting said control data into a first analog signal and for outputting said first analog signal to said voltage controlled oscillator as said voltage control signal;
demodulation means for demodulating data of said test recording signal read out by said read means using said clock signal to generate playback data;
control means including means for controlling said read means to read out from said recording medium said test recording signal of predetermined test pattern data recorded on said recording medium;
means for extracting with a predetermined timing said digital data output by said AD-conversion circuit of said phase locked loop circuit as a result of converting said test recording signal read by said read means from said recording medium for determining whether or not the extracted digital data is acceptable; and
means for adjusting the conversion characteristic of said DA-conversion circuit based at least on a result of the determination whether or not the extracted digital data is acceptable.

14. A recording and reproducing apparatus according to claim 13, wherein said control means changes the conversion characteristic of said DA-conversion circuit to predetermined characteristics, controls said read means to read out from said recording means said test recording signal conveying predetermined test pattern data recorded on said recording means, determines optimum conversion characteristic of said DA conversion circuit based on the result of determination of each predetermined characteristic, and adjusts the conversion characteristic of said DA conversion circuit to the optimum conversion characteristic.

15. A recording and reproducing apparatus according to claim 13, wherein said DA-conversion circuit comprises a DA converter for converting said control data into a second analog signal, and an offset adjusting circuit for providing an offset with an adjusted level to generate said first analog signal in accordance with said second analog signal output by said DA converter.

16. A recording and reproducing apparatus according to claim 13, wherein said DA-conversion circuit comprises an offset adjusting circuit for providing an offset adjusted by said control means, and a DA converter responsive to said offset and said control data for outputting said first analog signal.

17. A recording and reproducing apparatus according to claim 13, wherein said demodulation means include equalization means for performing predetermined waveform-equalization processing on recorded data of said test recording signal read out by said read means.

18. A recording and reproducing apparatus according to claim 17, wherein said control means adjusts a characteristic of said equalization means in accordance with a playback characteristic of said data after a conversion characteristic of said DA-conversion circuit has been adjusted.

19. A method for adjusting a phase locked loop circuit having a voltage controlled oscillator, an AD-conversion circuit, a phase locked loop control circuit and a DA-conversion circuit with an adjustable conversion characteristic, comprising the steps of:
generating a clock signal with a frequency determined by a voltage control signal supplied to the voltage controlled oscillator;
sampling an input signal with timing determined by the clock signal and converting sampled values into digital data by the AD-conversion circuit;
generating control data with values representing values of the digital data by the phase locked loop circuit;
converting the control data into an analog signal by the DA-conversion circuit with the adjustable conversion characteristic and outputting the analog signal to the voltage controlled oscillator as the voltage control signal;
changing the adjustable conversion characteristic of the DA-conversion circuit to predetermined values;
supplying the input signal having a known normal reproduced result of said changed conversion characteristics to the phase locked loop circuit;
causing the phase locked loop circuit to generate the clock signal;
reproducing data from the input signal in accordance with the generated clock signal;
comparing the reproduced data to the known normal reproduced result;
determining an optimum conversion characteristic for the DA-conversion circuit from results of comparison for a plurality of individual predetermined values; and
setting the optimum conversion characteristic in the DA-conversion circuit.

20. A method according to claim 19, wherein the phase locked loop circuit is part of a recording and reproducing apparatus having a recording medium, the input signal to the phase locked loop circuit being a reproduced signal from a recorded signal recorded on the recording medium.

* * * * *